United States Patent
Menon et al.

(10) Patent No.: US 11,558,766 B2
(45) Date of Patent: Jan. 17, 2023

(54) MEASUREMENTS FOR NARROW-BAND INTERNET OF THINGS DEVICES

(71) Applicant: QUALCOMM Incorporated, San Diego, CA (US)

(72) Inventors: Srikanth Menon, Hyderabad (IN); Raghavendra Shyam Ananda, Hyderabad (IN); Alberto Rico Alvarino, San Diego, CA (US); Praveen Maruthoormana Purushothaman, Ernakulam (IN)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 16/781,796

(22) Filed: Feb. 4, 2020

(65) Prior Publication Data

US 2020/0267585 A1   Aug. 20, 2020

(30) Foreign Application Priority Data

Feb. 15, 2019  (IN) .............................. 201941006019

(51) Int. Cl.
  *H04W 68/00*  (2009.01)
  *H04W 24/10*  (2009.01)
  *H04W 52/02*  (2009.01)

(52) U.S. Cl.
  CPC ....... *H04W 24/10* (2013.01); *H04W 52/0245* (2013.01); *H04W 68/005* (2013.01)

(58) Field of Classification Search
  CPC .... H04W 68/02; H04W 24/10; H04W 68/005
  See application file for complete search history.

(56) References Cited

U.S. PATENT DOCUMENTS

| 2017/0013391 | A1* | 1/2017 | Rico Alvarino | ...... H04W 76/28 |
| 2018/0287845 | A1 | 10/2018 | Kim et al. | |
| 2019/0045481 | A1* | 2/2019 | Sang | ..................... H04B 1/713 |

(Continued)

FOREIGN PATENT DOCUMENTS

WO   WO-2018174547 A1   9/2018

OTHER PUBLICATIONS

Ahn et al., machine translation of WO 2018/174547 A1 retrieved from https://worldwide.espacenet.com, Sep. 27, 2018, 9 pages. (Year: 2018).*

(Continued)

*Primary Examiner* — Hoon J Chung
(74) *Attorney, Agent, or Firm* — Qualcomm Incorporated

(57) ABSTRACT

Methods, systems, and devices for wireless communications are described that provide for measurements for narrow-band (NB) Internet of Things (IoT) devices. A user equipment (UE) may receive a cell-specific reference signal (CRS) during a paging occasion and via a non-anchor carrier. The UE may process the CRS by determining and/or making quality measurements of the paging carrier. The quality measurements may be used to determine whether a paging occasion should be terminated early to conserve UE power and to prevent an extended "on" duration during the discontinuous receive cycle of the UE. In some examples, the UE may combine statistics and/or measurements based on processing of both the CRS and a narrow-band reference signal (NRS).

26 Claims, 18 Drawing Sheets

(56) References Cited

U.S. PATENT DOCUMENTS

2020/0374734 A1* 11/2020 Tang ................. H04W 52/0251

OTHER PUBLICATIONS

International Search Report and Written Opinion—PCT/US2020/016751—ISA/EPO—dated May 4, 2020 (191376WO).
LG Electronics: "Discussion on NRS on Non-anchor Carrier", 3GPP Draft, R1-1812540, 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 11, 2018 (Nov. 11, 2018), XP051554484, 3 pages, Retrieved from the Internet: URL: http://www.3gpp.org/ftp/Meetings%5F3GPP%5FSYNC/RAN1/Docs/R1%2D1812540%2Ezip. [retrieved on Nov. 11, 2018] paragraph 2.
Qualcomm Incorporated: "Further Discussion of Wake-up Signal Functions", 3GPP Draft, R1-1807107, WUS Functions,3rd Generation Partnership Project (3GPP), Mobile Competence Centre, 650, Route Des Lucioles, F-06921 Sophia-Antipolis Cedex, France, vol. RAN WG2, No. Busan, Korea, May 21, 2018-May 25, 2018, May 20, 2018 (May 20, 2018), XP051442305, 7 pages, Retrieved from the Internet: URL: http://www.3gpp.org/ftp/Meetings%5F3GPP%5FSYNC/RAN1/Docs/. [retrieved on May 20, 2018] paragraph 4.

\* cited by examiner

Narrow-band reference signal with paging message

Cell-specific reference signal with no paging message

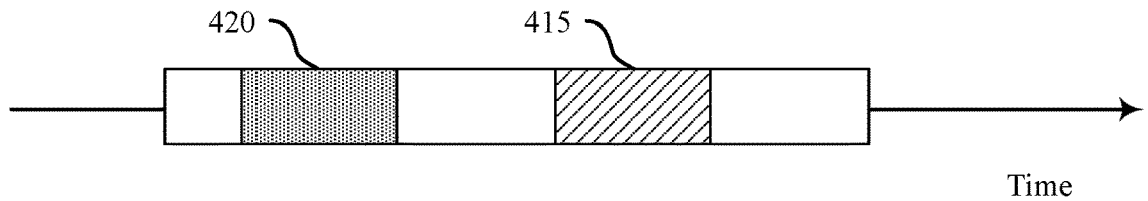
FIG. 4A
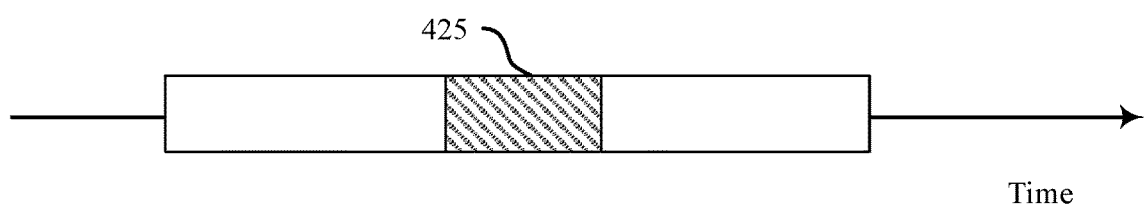
FIG. 4B
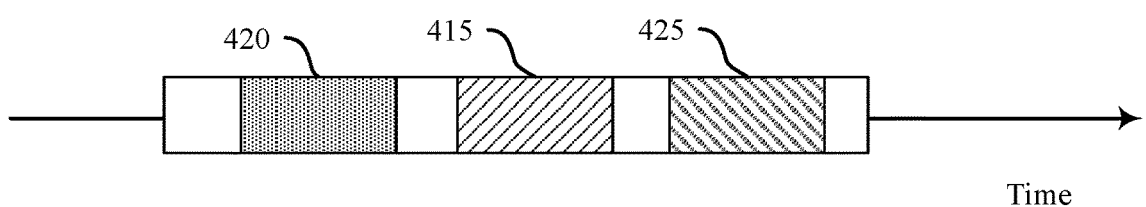
FIG. 4C
 Paging Message
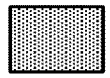 Narrow-band reference signal
 Cell-specific reference signal

MEASUREMENTS FOR NARROW-BAND INTERNET OF THINGS DEVICES

CROSS REFERENCE

The present Applications for patent claims the benefit of India Provisional Patent Application No. 201941006019 by MENON et al., entitled "MEASUREMENTS FOR NARROW-BAND INTERNET OF THINGS DEVICES," filed Feb. 15, 2019, assigned to the assignee hereof, and expressly incorporated herein.

BACKGROUND

The following relates generally to wireless communications, and more specifically to measurements for narrow-band (NB) Internet of Things (IoT) devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In wireless communications systems, one or more UE and one or more base stations may transmit and receive signals between one another. In some cases, the UE may not be used for a period of time and may enter an idle mode and/or a discontinuous reception (DRx) mode to conserve power at the UE. Even though the UE may be in a DRx mode, the base station may transmit a paging message. Due to the directional nature of communicating in mobile networks, the base station may transmit the paging message as a directional beam-based transmission as opposed to an omnidirectional paging broadcast. In some examples, UEs may communicate with anchor or primary carriers and non-anchor or secondary carriers. The UE may be configured to receive paging information on the NB physical downlink control channel (NPDCCH) from a non-anchor paging carrier. In some examples, the paging message may not be present, thus the NB reference signal (NRS) may not be received, especially when the UE is in a discontinuous receive (DRx) cycle. Unfortunately, the absence of the NRS may lead to the inability of the UE to determine the quality of the paging carrier. A method for detecting poor conditions and reduced quality of the paging carrier may therefore be desirable.

SUMMARY

The described techniques relate to improved methods, systems, devices, and apparatuses that support measurements for NB IoT devices. The described techniques provide for using cell-specific reference signals (CRS) to measure various quality parameters of the paging carrier. In some examples, a NB reference signal may also be received and may be used to measure various quality parameters. In some examples, the CRS and the NRS measurements may be combined and used to determine whether early termination of the paging occasion is appropriate to conserve power at the UE.

In some examples, the UE may receive system information via an anchor carrier. The information may include an indication that a CRS may be transmitted via a second carrier and during a paging occasion. The UE may monitor the second carrier for the CRS during the paging occasion and may process the CRS. In some cases, an additional reference signal such as an NRS may be received on the second carrier during the paging occasion. Measurements may be taken of the CRS and, if present, the NRS, and the measurements of the CRS, the NRS, or both may be used to make quality determinations of the paging carrier. The UE may base power saving decisions on the quality determinations, such as whether to terminate the paging occasion early.

A method of wireless communications at a UE is described. The method may include receiving system information via an anchor carrier including an indication that a CRS will be transmitted in a second carrier different from the anchor carrier during a paging occasion, monitoring, based on the indication, the second carrier for the CRS during the paging occasion, and processing the CRS received on the second carrier during the paging occasion.

An apparatus for wireless communications at a UE is described. The apparatus may include a processor, memory in electronic communication with the processor, and instructions stored in the memory. The instructions may be executable by the processor to cause the apparatus to receive system information via an anchor carrier including an indication that a CRS will be transmitted in a second carrier different from the anchor carrier during a paging occasion, monitor, based on the indication, the second carrier for the CRS during the paging occasion, and process the CRS received on the second carrier during the paging occasion.

Another apparatus for wireless communications at a UE is described. The apparatus may include means for receiving system information via an anchor carrier including an indication that a CRS will be transmitted in a second carrier different from the anchor carrier during a paging occasion, monitoring, based on the indication, the second carrier for the CRS during the paging occasion, and processing the CRS received on the second carrier during the paging occasion.

A non-transitory computer-readable medium storing code for wireless communications at a UE is described. The code may include instructions executable by a processor to receive system information via an anchor carrier including an indication that a CRS will be transmitted in a second carrier different from the anchor carrier during a paging occasion, monitor, based on the indication, the second carrier for the CRS during the paging occasion, and process the CRS received on the second carrier during the paging occasion.

Some examples of the method, apparatuses, and non-transitory computer-readable medium described herein may further include operations, features, means, or instructions for processing an additional reference signal received on the second carrier during the paging occasion.

Some examples of the method, apparatuses, and non-transitory computer-readable medium described herein may further include operations, features, means, or instructions for combining measurements made of both the CRS and the additional reference signal.

In some examples of the method, apparatuses, and non-transitory computer-readable medium described herein, the additional reference signal may be an NRS.

Some examples of the method, apparatuses, and non-transitory computer-readable medium described herein may further include operations, features, means, or instructions for receiving, with the system information, a second indication of a physical cell of a cell transmitting the CRS.

In some examples of the method, apparatuses, and non-transitory computer-readable medium described herein, processing the CRS may include operations, features, means, or instructions for determining a quality of the second carrier based on measurements made of the CRS.

In some examples of the method, apparatuses, and non-transitory computer-readable medium described herein, determining the quality of the second carrier may include operations, features, means, or instructions for estimating a reference signal received power (RSRP) of the second carrier based on the CRS.

In some examples of the method, apparatuses, and non-transitory computer-readable medium described herein, determining the quality of the second carrier may include operations, features, means, or instructions for estimating a signal to noise ratio (SNR) of the second carrier based on the CRS.

In some examples of the method, apparatuses, and non-transitory computer-readable medium described herein, determining the quality of the second carrier may include operations, features, means, or instructions for determining a narrow-band reference signal received power (NRSRP) of the second carrier based on the CRS.

In some examples of the method, apparatuses, and non-transitory computer-readable medium described herein, determining the quality of the second carrier may include operations, features, means, or instructions for estimating an SNR of the second carrier based on the CRS, monitoring the second carrier for a paging message during the paging occasion, and affecting an early termination of the paging occasion based on the estimated SNR of the second carrier.

In some examples of the method, apparatuses, and non-transitory computer-readable medium described herein, the UE may be an NB IoT device.

A method of wireless communications at a base station is described. The method may include identifying an anchor carrier for communicating with a UE and a second carrier for communicating with the UE, the second carrier being different from the anchor carrier, transmitting, via system information on the anchor carrier, an indication that a CRS is to be transmitted via the second carrier during a paging occasion for the UE, and transmitting the CRS via the second carrier during the paging occasion.

An apparatus for wireless communications at a base station is described. The apparatus may include a processor, memory in electronic communication with the processor, and instructions stored in the memory. The instructions may be executable by the processor to cause the apparatus to identify an anchor carrier for communicating with a UE and a second carrier for communicating with the UE, the second carrier being different from the anchor carrier, transmit, via system information on the anchor carrier, an indication that a CRS is to be transmitted via the second carrier during a paging occasion for the UE, and transmit the CRS via the second carrier during the paging occasion.

Another apparatus for wireless communications at a base station is described. The apparatus may include means for identifying an anchor carrier for communicating with a UE and a second carrier for communicating with the UE, the second carrier being different from the anchor carrier, transmitting, via system information on the anchor carrier, an indication that a CRS is to be transmitted via the second carrier during a paging occasion for the UE, and transmitting the CRS via the second carrier during the paging occasion.

A non-transitory computer-readable medium storing code for wireless communications at a base station is described. The code may include instructions executable by a processor to identify an anchor carrier for communicating with a UE and a second carrier for communicating with the UE, the second carrier being different from the anchor carrier, transmit, via system information on the anchor carrier, an indication that a CRS is to be transmitted via the second carrier during a paging occasion for the UE, and transmit the CRS via the second carrier during the paging occasion.

Some examples of the method, apparatuses, and non-transitory computer-readable medium described herein may further include operations, features, means, or instructions for transmitting, with the system information, a second indication of a physical cell identity for the base station.

BRIEF DESCRIPTION OF THE DRAWINGS

FIGS. 4A-C illustrate examples of a system for wireless communications that supports measurements for NB IoT devices in accordance with aspects of the present disclosure.

DETAILED DESCRIPTION

Figure 1:
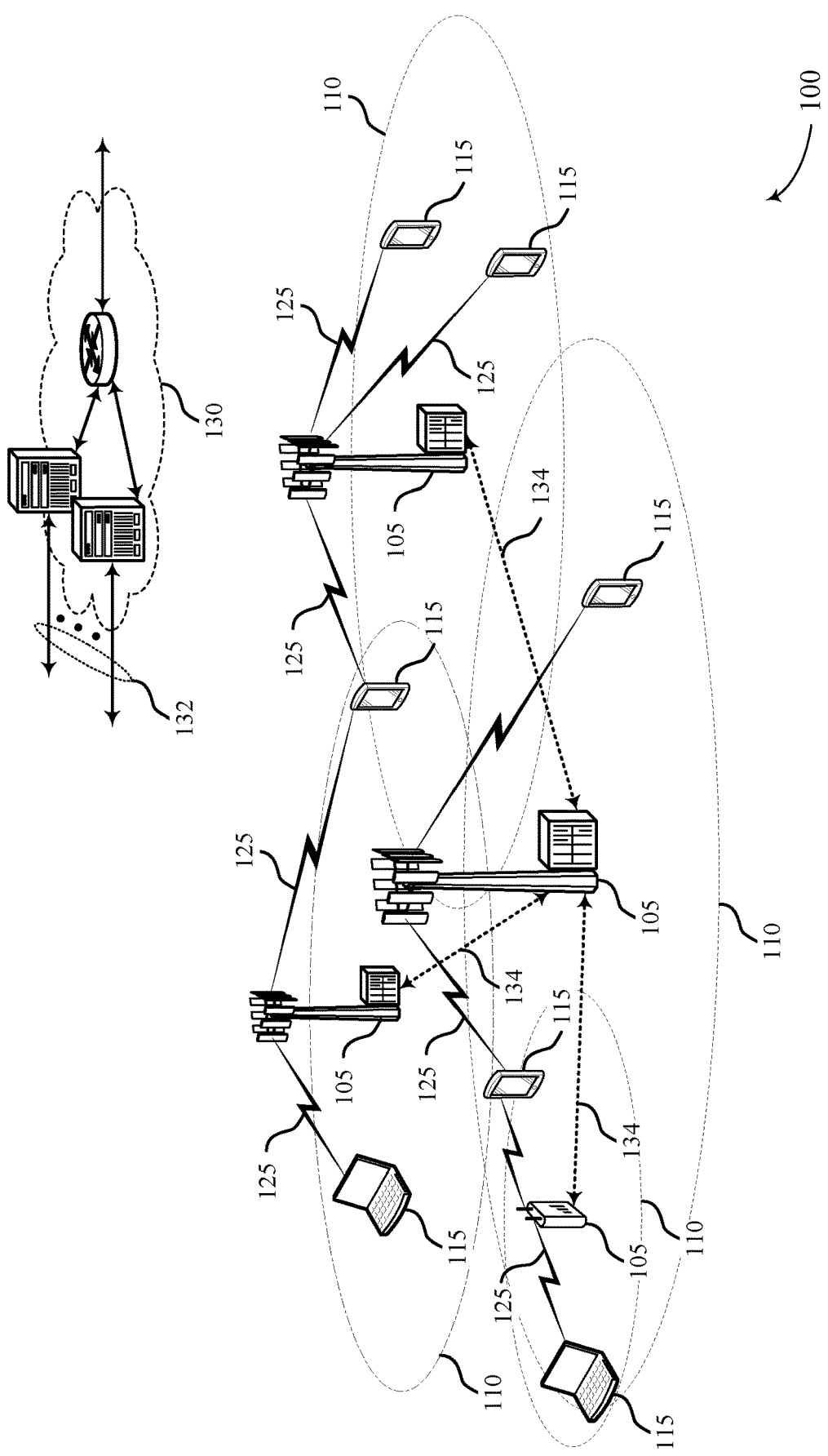
FIG. 1 illustrates an example of a system for wireless communications that supports measurements for NB IoT devices in accordance with aspects of the present disclosure.

In some wireless communications systems, a base station may transmit UE directed signals to a UE using various techniques. One technique may include beam forming or beam sweeping. In beam forming or beam sweeping, a base station may direct a transmission via a narrow beam so that only one UE or a small set of UEs receive the transmission. In one example, paging messages may be transmitted via a narrow beam. A narrow beam paging message may also be accompanied by an NRS. Additional techniques for communication between a base station and a UE may include the use of less narrow beams (e.g., wide beam communications or omnidirectional communications). One type of reference signal that may be communicated via less narrow beams may include a CRS. The timing and resources on which the various reference signals may be received may be indicated to a UE via system information.

In some examples, the UE may receive a paging message and an accompanying NRS via an anchor carrier. Additionally or alternatively, in other examples, the UE may receive the paging message and the NRS via a second carrier or a non-anchor carrier. In either case, the base station may transmit the NRS to the UE when a paging message is available. As an example, when no paging message is present, the base station may not transmit the NRS to the UE. The UE may use the NRS to determine a quality of the paging carrier. However, the UE may beneficially determine the quality of the paging carrier at more frequent intervals even in the absence of the NRS. One option could include a base station transmitting an NRS at each paging occasion, regardless of whether a paging message is to be transmitted. However, by using a dedicated resource for transmission of the NRS during each paging occasion (e.g., a NB resource block (RB)), this option renders the NB RB unavailable for use for other purposes by other networks, for example, by an LTE cell. Further, the duplicative NRS transmissions may result in interference and may puncture LTE RBs.

Therefore, a more acceptable method for performing the paging carrier quality measurements may include using a CRS, which may be transmitted to the UE during the paging occasions. The received CRS may then be used by the UE to perform quality measurements of the paging carrier. In some examples, performing these quality measurements using the CRS may include receiving system information from an anchor carrier. The system information may include an indication that a CRS may be transmitted via a non-anchor carrier during a paging occasion. The UE may then monitor the non-anchor carrier for the CRS during the paging occasion and then process the received CRS. The measurements the UE may perform using the CRS may allow the UE to determine, for example, an RSRP, an SNR, an NRSRP, or any combination thereof. In addition, the UE may use the CRS measurements to determine whether the paging occasion should be terminated early. In some examples, both the CRS and the NRS may be present and the UE may optionally combine the measurements based on both the CRS and the NRS.

Particular aspects of the subject matter described herein may be implemented to realize one or more advantages. The described techniques may support improvements in power conservation at a UE without additional signaling from a base station (e.g., without an additional load on the network). For example, the described techniques may enable a UE to perform quality measurements based on CRS and/or NRS, without the use of additional pilot signals, and perform early termination of a monitoring occasion (e.g., a paging occasion). This may result in improved power conservation at the UE and fewer transmissions from a base station, which may reduce system overhead and improve network efficiency based on fewer transmissions and shorter channel occupancy time compared to a network employing additional signaling. Additionally, based on performing quality measurements using CRS and NRS, the described techniques enable backwards compatibility with previous generations of devices and/or devices with different configurations, which may result in further improvements in network efficiency because a base station may communicate similarly with a variety of UEs.

Aspects of the disclosure are initially described in the context of a wireless communications system. Example wireless communications systems for performing measurements of the paging carrier based on CRS and/or NRS at the UE and process flows for implementing techniques discussed herein are described. Aspects of the disclosure are further illustrated by and described with reference to diagrams and flowcharts that relate to measurements for NB IoT devices.

FIG. 1 illustrates an example of a wireless communications system 100 that supports measurements for NB IoT devices in accordance with aspects of the present disclosure. The wireless communications system 100 includes base stations 105, UEs 115, and a core network 130. In some examples, the wireless communications system 100 may be an LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), NB IoT, enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an IoT device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to NB communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest SNR, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a NB protocol type that is associated with a predefined portion or range (e.g., set of subcarriers or RBs) within a carrier (e.g., "in-band" deployment of a NB protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, UE 115 may be an NB IoT device, and may frequently enter into an idle mode or a DRx mode. While in the idle mode or DRx mode, UE 115 may periodically awaken to determine whether a paging message is available to be received. While awake, UE 115 may measure a reference signal, such as an NRS when a paging message is available. However, if no paging message is available, UE 115 may receive a CRS via a non-anchor carrier during a paging occasion, and the CRS may be used by UE 115 to perform quality measurements of the paging carrier. In some examples, after receiving the CRS, UE 115 may then process the CRS and may perform quality measurements based on the CRS. The quality measurements that UE 115 may perform using the CRS may allow UE 115 to determine an RSRP, an SNR, an NRSRP, or any combination thereof. Additionally, UE 115 may use the measurements to determine whether the paging occasion should be terminated early, thus resulting in power conservation at UE 115.

One method for performing the paging carrier quality measurements may include receiving system information via an anchor carrier which may include an indication that a CRS will be transmitted via a second carrier (e.g., a non-anchor carrier) during a paging occasion. UE 115 may monitor the second carrier for the CRS during the paging occasion and may process the CRS, which may be received via the second carrier during the paging occasion. UE 115 may process an additional reference signal (e.g., an NRS) received on the second carrier during the paging occasion and may combine the CRS-based measurements and the additional reference signal-based measurements. UE 115 may additionally receive with the system information, an indication of a PCID of a cell transmitting the CRS.

In some examples, UE 115 may determine a quality of the second carrier (e.g., the paging carrier) based on the measurements made based on the CRS. UE 115 may estimate an RSRP of the second carrier and may also estimate an SNR of the second carrier, both of which may be based on the CRS. Additionally or alternatively, UE 115 may determine an NRSRP of the second carrier based on the CRS.

Additionally, in some examples, UE 115 may estimate an SNR of the second carrier, monitor the second carrier for the paging message during the paging occasion, and may perform an early termination of the paging occasion based on the SNR of the second carrier. In some cases, early termination of the paging occasion may shorten the wake-up duration of the DRx mode and conserve power.

Figure 2:
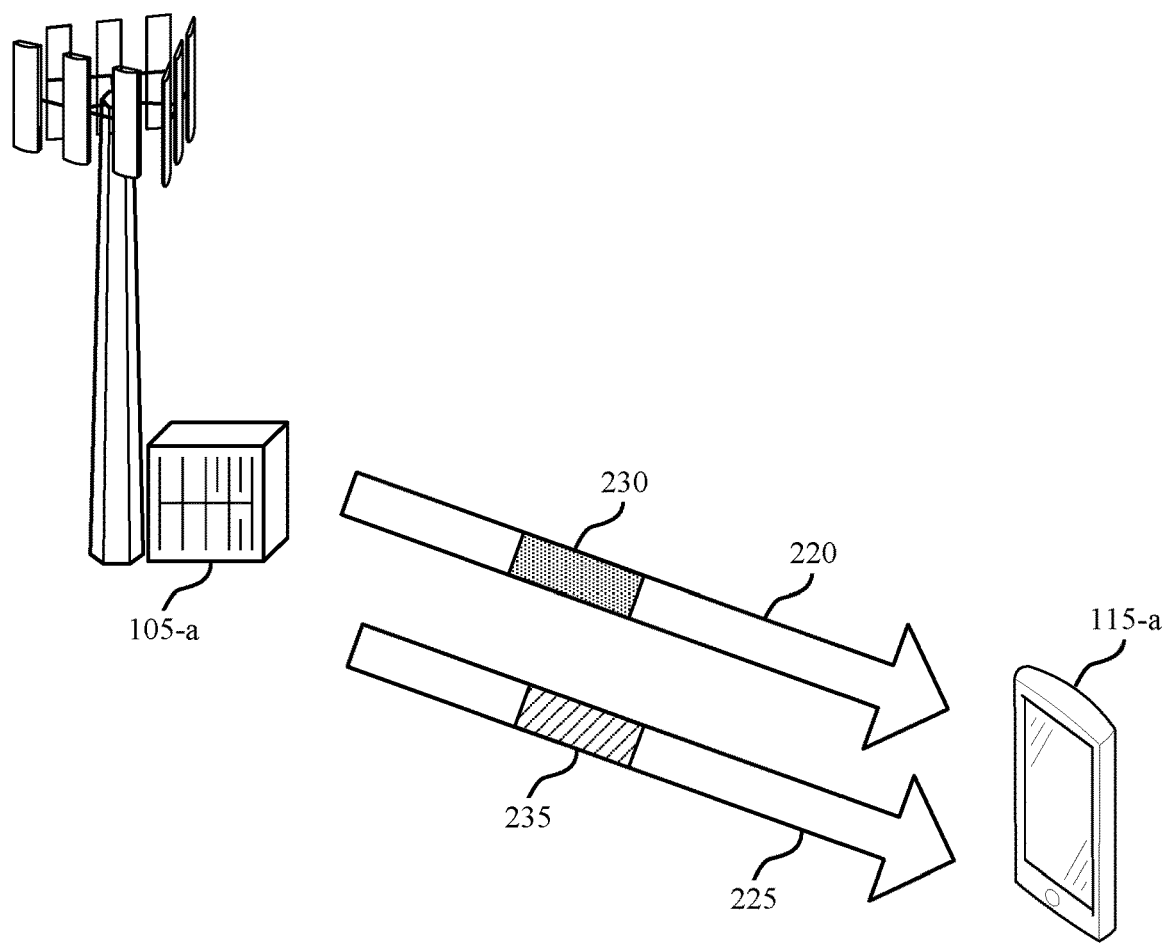
FIG. 2 illustrates an example of a system for wireless communications that supports measurements for NB IoT devices in accordance with aspects of the present disclosure.
Figure 2:
Figure 2:

FIG. 2 illustrates an example of a wireless communications system 200 that supports measurements for NB IoT devices in accordance with aspects of the present disclosure. In some examples, the wireless communications system 200 may implement aspects of wireless communications system 100. In the example of FIG. 2, the wireless communications system 200 may include a base station 105-a and a UE 115-a, which may be examples of a base station 105 and a UE 115 as described with reference to FIG. 1. In some cases, UEs may monitor one carrier at a time.

As illustrated in FIG. 2, base station 105-a may transmit, to UE 115-a, a paging message on anchor carrier 220 during a paging occasion, and which may include an NRS 230. After receiving the NRS 230 at UE 115-a, the NRS 230 may be used by UE 115-a to perform quality measurements of the anchor carrier. In some examples, UE 115-a may make serving cell measurements of the paging carrier and/or SNR measurements of the paging carrier based on the NRS 230. The quality measurements based on the NRS 230 may be used to detect excessive interference conditions and/or may be used to determine whether early termination for the paging occasion may be appropriate.

In some examples, UE 115-a may be an NB IoT device which may be configured to receive an NPDCCH. The NPDCCH may be communicated via the non-anchor carrier 225 and may be transmitted by, for example, base station 105-b. In some examples, UE 115-a may be in an idle mode or a DRx mode. As UE 115-a switches out of the DRx mode to wake up, based on the UE identity, UE 115-a may map to a specific paging carrier which may be any non-anchor carrier. Thus, although UE 115-a may be waking up to a specific paging carrier, the carrier may be an anchor carrier or a non-anchor carrier. In the example UE 115-a wakes up and maps to a non-anchor carrier, a paging message may not be present.

Given this UE configuration, in some examples, NRS 230 may not be received unless a paging message is present. In some examples, the paging message may not be present to save bandwidth. In this example, the NB IoT RB may be used for an LTE cell when it is not in use, thus the NB IoT RB may not be available for the paging message. In other examples, the addition of NRS tones may produce interference to LTE cells (e.g., by puncturing of the LTE RBs). Without the paging message, UE 115-a may not receive the NRS 230 a large percentage of the time. Accordingly, a paging message may not be assumed for UE 115-a in a DRx mode.

In some examples of FIG. 2, instead of receiving and using the NRS 230 to take the quality measurements, UE 115-a may receive the CRS 235 on non-anchor carrier 225. UE 115-a may use the LTE CRS tones of the CRS 235 to take the quality measurements (e.g., SNR or RSRP measurements of the paging carrier) without using the NRS 230. Quality measurements of the paging carrier, based on the CRS 235, may be practical as no additional load may be placed on the network due to the lack of additional pilot signals transmitted by base station 105-a. Additionally, when base station 105-a transmits the system information to UE 115-a there may little impact on the network, due to the low additional processing complexity. Further, using the CRS 235 may provide backwards compatibility with previous generation UEs and/or UEs that may be differently configured.

Figure 3:
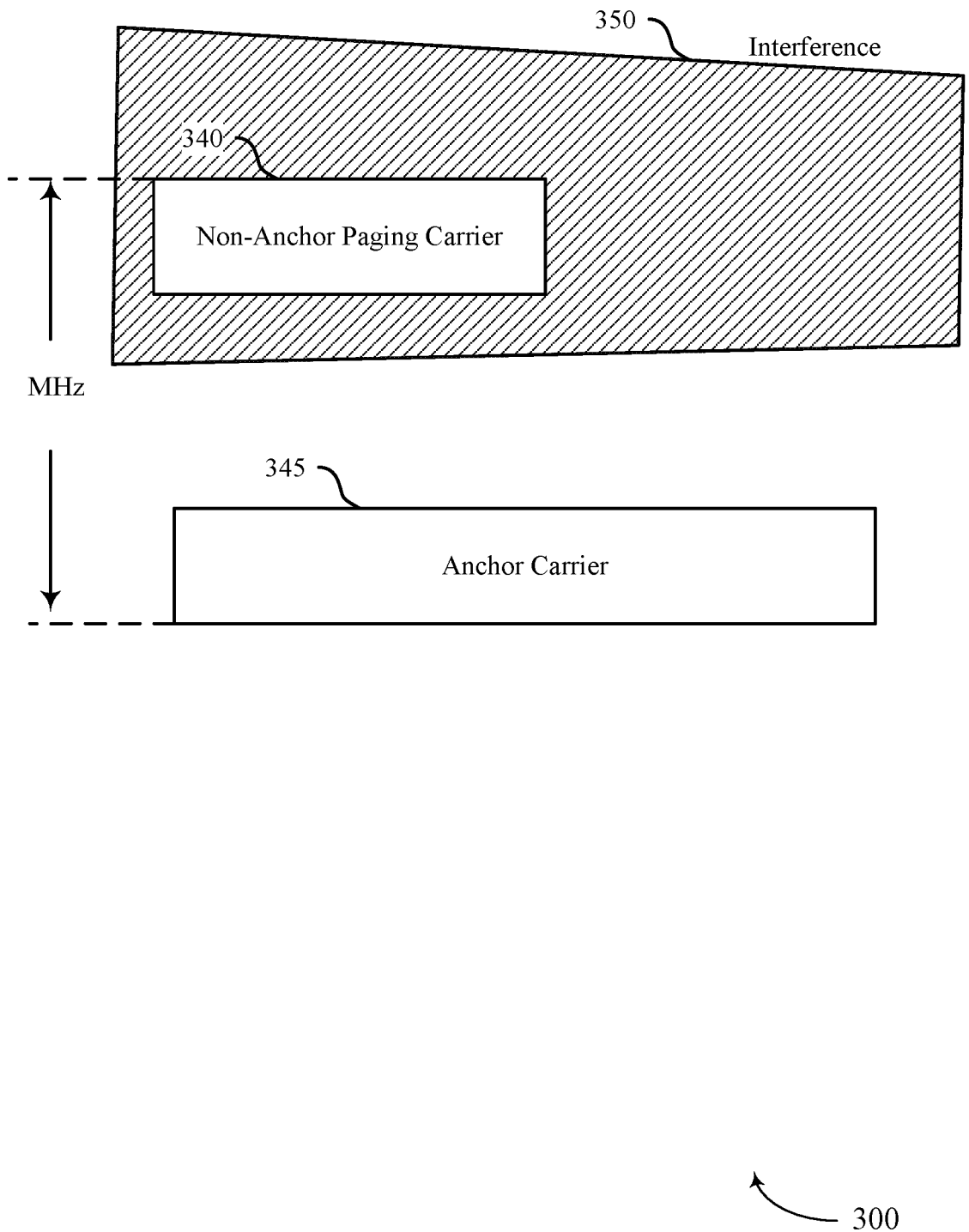
FIG. 3 illustrates an example of a system for wireless communications that supports measurements for NB IoT devices in accordance with aspects of the present disclosure.

FIG. 3 illustrates an example of a wireless communications system 300 that supports measurements for NB IoT devices in accordance with aspects of the present disclosure. In some examples, the wireless communications system 300 may implement aspects of wireless communications systems 100 and 200. In the example of FIG. 3, the wireless communications system 300 may include an anchor carrier 345 and a non-anchor paging carrier 340 which may be examples of anchor carriers and non-anchor carriers as discussed with respect to FIG. 2.

As illustrated in FIG. 3, an anchor carrier 345 and a non-anchor paging carrier 340 may be used to carry the paging message as previously discussed with respect to FIG. 2. In FIG. 3, and as discussed with respect to FIGS. 1 and 2, UE 115 (not illustrated in FIG. 3) may receive a CRS and may take CRS-based measurements of the non-anchor paging carrier 340. In some examples, non-anchor paging carrier may experience interference 350 which may be detected by taking quality measurements of non-anchor paging carrier 340, and based on the received CRS. In FIG. 3 and similar to FIG. 2, UE 115 may be configured to receive paging via NPDCCH on non-anchor paging carrier 340.

In some examples of FIG. 3, the paging message and, accordingly, the NRS may not be present for reasons discussed herein. Because the NRS or pilot signal may not be guaranteed when a paging message is not present, UE 115 may not be able to appropriately decode received signals. In some examples, the pilot signal may be a transmitted signal which may be received by a device (e.g., UE 115), so that the device may decode the received signal. In FIG. 3, in the absence of the NRS or pilot signal, interference 350 may not be measured on the non-anchor paging carrier.

In some examples of FIG. 3, the absence of the NRS may impact the receiver design of UE 115. Due to the NRS absence, UE 115 may not make serving cell measurements and may attempt to tune to the anchor carrier 345 for this measurement, thus resulting in wasted power at UE 115. UE 115 may make serving cell measurements of received power, which may aid in the determination of cell selection and cell re-selection. Further, UE 115 may use NRS-based SNR measurements of the paging carrier for determining whether or not to terminate the paging occasion early. However, due to the lack of NRS or the pilot signal, UE 115 may be unable to make the SNR measurement of the paging carrier. As such, UE 115 may be unable to terminate the paging occasion early.

For example, non-anchor paging carrier 340 may experience interference 350, but UE 115 may be unable to detect the interference 350 due to the lack of NRS. Accordingly, UE 115 may be unable to determine whether or not the interference 350 is excessive (e.g., exceeds a threshold interference level that results in an insufficient RSRP or SNR, among other quality measurements). As such, UE 115 may be unable to determine to terminate the paging occasion early if the interference 350 is associated with excessive interference conditions. In some cases, this may result in additional power consumption by UE 115 due to the extension of the "on" duration of every UE DRx cycle (e.g., based on unsuccessfully receiving transmissions from base station 105 due to the interference 350).

FIGS. 4A-C illustrate examples of timelines 400, 405, and 410, respectively, for wireless communications that support measurements for NB IoT devices in accordance with aspects of the present disclosure. In some examples, the timelines 400 may implement aspects of wireless communications systems 100, 200 and 300. In the examples of FIG. 4A, the timeline 400 may include representations of a paging message 415 and NRS 420, which may be an example of NRS 230 with a paging message as described with reference to FIG. 2. In the examples of FIGS. 4B and 4C, the timelines 405 and 410 may also include representations of a CRS 425.

FIGS. 4A-C illustrate three different combinations of signals and the way in which the signals may be received during a paging occasion and at a UE 115 (UE 115 not illustrated in FIG. 4). In FIG. 4A, NRS 420 may be transmitted via a paging message 415, during a paging opportunity, and may be transmitted on an anchor carrier. In FIG. 4B, CRS 425 may be transmitted during a paging occasion and on a non-anchor carrier, and in FIG. 4C, NRS 420, CRS 425, and the paging message 415 may be communicated on either one or both of an anchor carrier and non-anchor carrier.

In some examples, it may be difficult for UE 115 to receive the NRS 420 in the absence of paging message 415. Without paging message 415, receipt of NRS 420 from a non-anchor carrier may not be guaranteed (e.g., may be unlikely). In the example, UE 115 may not receive NRS 420 and, accordingly, UE 115 may be unable to take quality measurements of the paging carrier. The absence of NRS 420 may result in UE 115 unnecessarily extending its "on" duration of the DRx cycle and wasting power, as previously discussed. In some implementations, even though NRS 420 may be absent, UE 115 may perform quality measurements (e.g., SNR or RSRP) using LTE CRS tones, as discussed in further detail herein.

In some examples of FIGS. 4A-C, UE 115 may be configured to receive a paging message via NPDCCH on a non-anchor carrier. A base station 105 may transmit, using a paging carrier or a non-anchor carrier, CRS 425 during a paging occasion. In some aspects, base station 105 may transmit CRS 435 via system information and without a paging message. In some examples, the paging carrier may be an NB IoT paging carrier and may be in an in-band same PCI mode. In this mode, the network may advertise the availability of CRS tones during a paging occasion, if available. In some examples, the network may advertise the availability of the CRS tones by using the paging carrier to transmit system information, which may include an indication that a CRS (e.g., CRS 425) may be transmitted via a second carrier during a paging occasion. In some examples, the second carrier may be different from the anchor carrier (e.g., may be a non-anchor carrier). Continuing the example, UE 115 may monitor the non-anchor carrier for the CRS during the paging occasion and may receive the CRS on the second carrier during the paging occasion. After receiving the CRS, UE 115 may process the CRS.

In some examples of FIGS. 4A-C, the paging carrier may be an NB IoT paging carrier and may be in an in-band diff PCI mode. In this mode, the network may advertise the availability of CRS tones during a paging occasion, if available, and may additionally advertise an LTE PCID for a cell. In some aspects, UE 115 may use the PCID to calculate a scrambling sequence. The network may advertise the availability of CRS tones and the base station 105 may transmit a paging message on a paging carrier (e.g., a non-anchor carrier), which may include an indication that a CRS will be transmitted during a certain time duration, or during a number of time durations, where the time durations may be paging occasions. In some examples of an in-band case or scenario, the NB IoT may be deployed in a single RB for an LTE cell.

Because UE 115 may have the availability of CRS in paging occasions, UE 115 may perform a number of different quality measurements for the paging carrier. In some examples, UE 115 may run a parallel SNR/RSRP estimator, which may be based on the CRS 425. In some examples, UE 115 may compute NRSRP based on the CRS, even though the NRS may not be present. In computing NRSRP, UE 115 may refrain from tuning to the anchor carrier for serving cell measurements, which may result in power conservation. Additionally or alternatively, UE 115 may use the CRS-based SNR to make the determination of whether to perform early termination of the paging occasion. UE 115 may also detect the presence of an NRS-based CRS-SNR estimate. In some examples, UE 115 may determine that the NRS is not present and therefore determine that the page is not present. Accordingly, UE 115 may determine that early termination of the paging occasion is appropriate.

As illustrated in FIG. 4C, UE 115 may receive NRS 420 and CRS 425 via the paging message 415, which may be transmitted on either one or both of the anchor carrier and/or the non-anchor carrier. UE 115 may optionally combine the statistics of the NRS and the CRS (e.g., may combine CRS-based quality measurements with NRS-based quality measurements when the NRS is present). As discussed with reference to FIG. 3, the quality measurements of the paging carrier may be used to terminate the paging occasion early, thus ending the "on" duration for the DRx cycle of UE 115.

Figure 5:
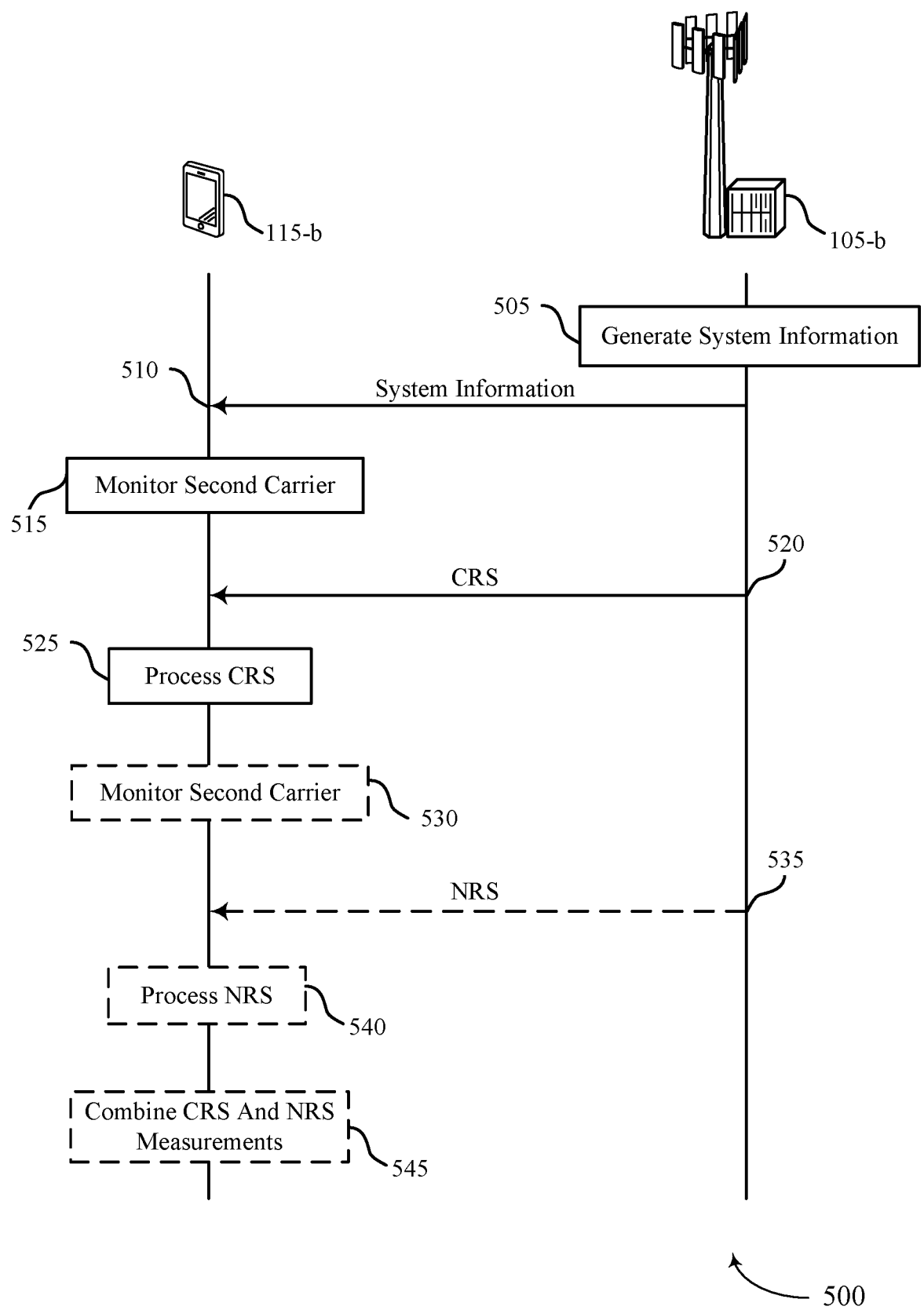
FIG. 5 illustrates an example of a process flow that supports enhanced measurements for NB IoT devices in accordance with aspects of the present disclosure.

FIG. 5 illustrates an example of a process flow 500 that supports measurements for NB IoT devices in accordance with aspects of the present disclosure. In some examples, process flow 500 may implement aspects of wireless communications system 100. In the example of FIG. 5, the process flow 500 may include a base station 105-b and a UE 115-b, which may be examples of a base station 105 and a UE 115 as described with reference to FIG. 1 and a base station 105-a and a UE 115-a as described with reference to FIG. 2. Additionally, in the example of FIG. 5, the process flow 500 may include one example of a base station transmitting PDCCHs to a UE, which may be examples of the transmitted PDCCHs with UE-specific configurations as discussed with reference to FIG. 2.

In FIG. 5, optional steps may be depicted with dotted lines. Additionally, although the steps of FIG. 5 are discussed and numbered in an order, the steps may be performed in any appropriate order, all steps may be performed, or some steps may be omitted as appropriate.

At 505, base station 105-b may generate system information. In some examples, base station 105-b may generate system information for transmission on a first carrier (e.g., an anchor carrier) and the system information may include an indication that a CRS will be transmitted on a second carrier different from the first carrier (e.g., a non-anchor carrier).

At 510, base station 105-b may transmit the system information on the anchor carrier. UE 115-b may receive the system information via the anchor carrier including an indication that the CRS will be transmitted during a paging occasion and via the second carrier (e.g., a non-anchor carrier). Additionally or alternatively, the system information may include an indication of an availability of the CRS (e.g., an availability of CRS tones).

At 515, UE 115-b may monitor the second carrier during the paging occasion as indicated in the system information received at 510. At 520, base station 105-b may transmit the CRS via the second carrier during the paging occasion. Accordingly, UE 115 may receive the CRS on the second carrier during the paging occasion and, at 525, may process the CRS. In some examples, UE 115-b may process the CRS by performing quality measurements of the paging carrier as discussed in further detail in FIG. 4.

At 530, UE 115-*b* may optionally monitor the second carrier for an NRS. At 535, base station 105-*b* may optionally transmit the NRS (e.g., based on whether a page is present) and UE 115-*b* may receive the NRS based on whether base station 105-*b* transmitted the NRS. In some examples, base station 105-*b* may transmit the NRS with a paging message, such that in the absence of a paging message base station 105-*b* may not transmit the NRS and the NRS may be unavailable to UE 115-*b*.

At 540, UE 115-*b* may optionally process NRS. In some examples, UE 115-*b* may process the NRS by taking quality measurements of the paging carrier. At 545, UE 115-*b* may optionally combine the CRS and NRS statistics (e.g., UE 115-*b* may combine the CRS-based quality measurements and the NRS-based quality measurements).

In some implementations, processing the CRS at UE 115-*b* may include running a parallel SNR/RSRP estimator, which may be based on the CRS. In some examples, UE 115-*b* may compute NRSRP based on the CRS (e.g., when NRS is not present). In computing NRSRP, UE 115-*b* may refrain from tuning to the anchor carrier for serving cell measurements, which may result in power conservation. Additionally or alternatively, UE 115-*b* may use the CRS-based SNR to determine whether to perform early termination of the paging occasion. UE 115-*b* may also detect the presence of an NRS-based CRS-SNR estimate.

Figure 6:
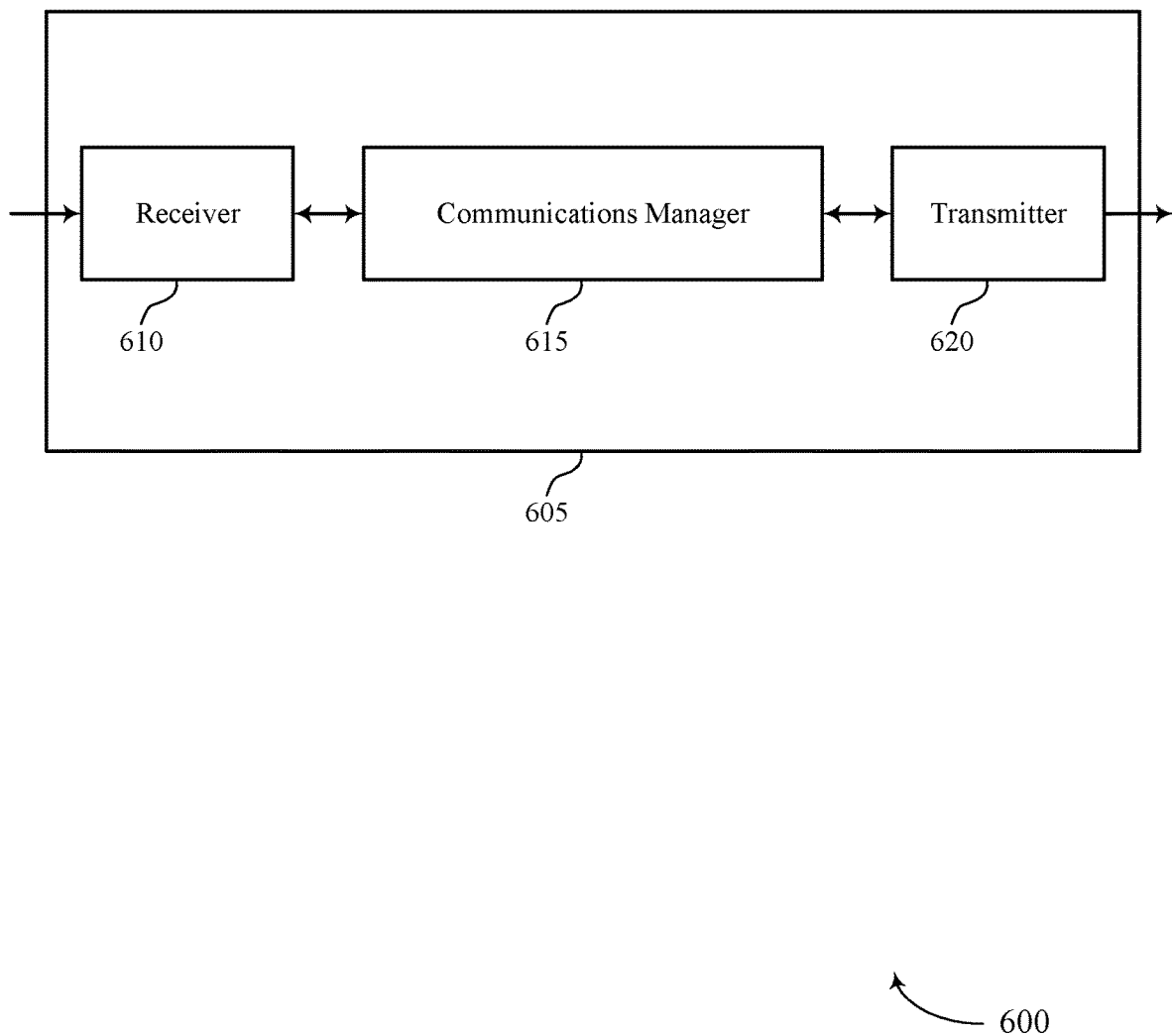
FIGS. 6 and 7 show diagrams of devices that support enhanced measurements for NB IoT devices in accordance with aspects of the present disclosure.

FIG. 6 shows a diagram 600 of a device 605 that supports measurements for NB IoT devices in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to measurements for NB IoT devices, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive system information via an anchor carrier including an indication that a CRS will be transmitted in a second carrier different from the anchor carrier during a paging occasion, monitor, based on the indication, the second carrier for the CRS during the paging occasion, and process the CRS received on the second carrier during the paging occasion. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands or carriers.

The communications manager 615 as described herein may be implemented to realize one or more potential advantages. One implementation may allow the device 605 to measure interference conditions during paging occasions and to perform an early termination of paging occasions without additional signaling from a base station, such as a base station 105 as described herein. This may enable the device 605 to operate shorter "on" or wake-up durations in a DRx mode, which may result in improved power savings and longer battery life.

Further, based on measuring interference conditions without additional signaling from a base station, the communications manager 615 may achieve shorter "on" or wake-up durations without increasing a number of reception opportunities the device 605 may monitor. Likewise, the communications manager 615 may perform fewer processing operations and lower processing complexity compared to a device that employs additional signaling to perform quality measurements.

Figure 7:
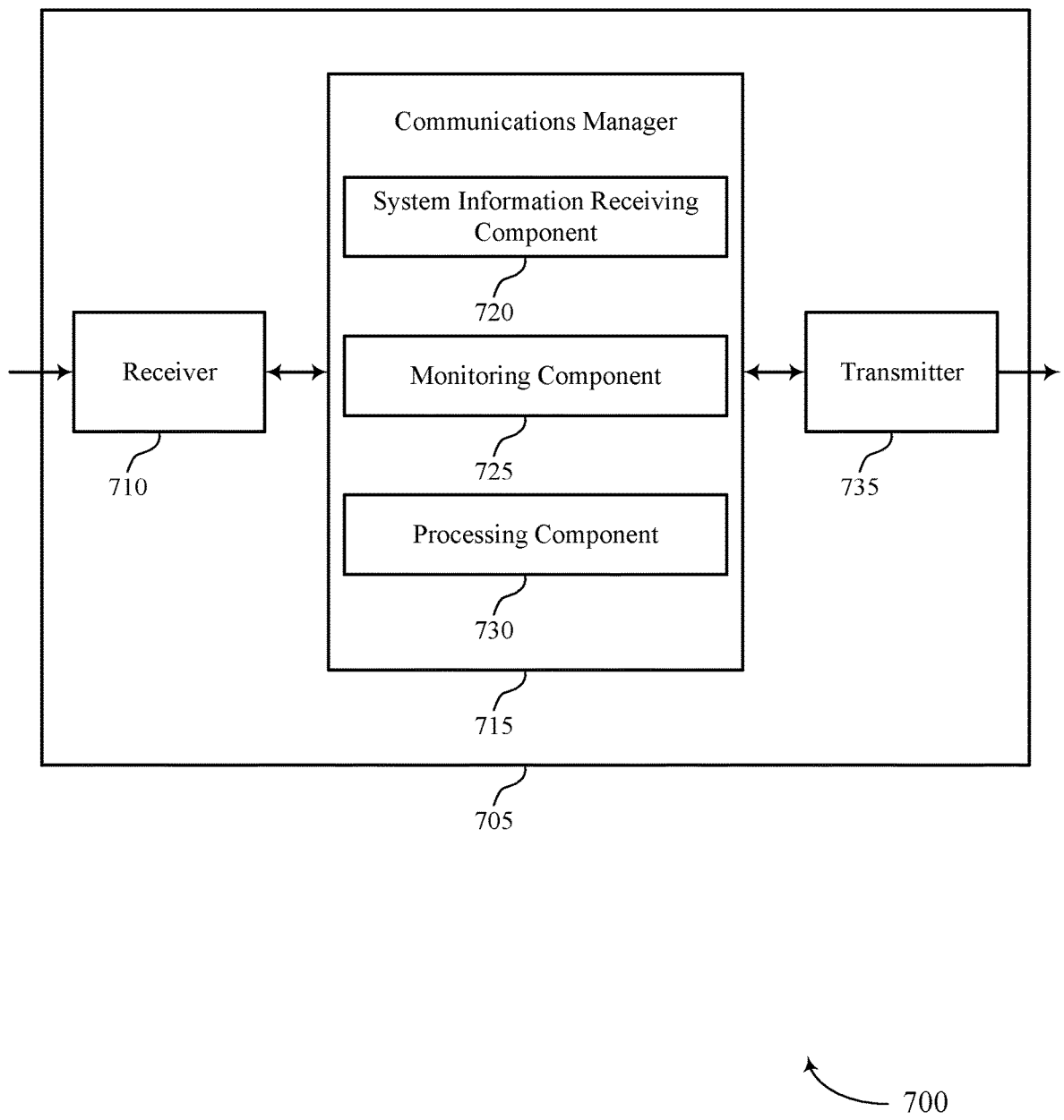

FIG. 7 shows a diagram 700 of a device 705 that supports measurements for NB IoT devices in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, information channels related to measurements for NB IoT devices, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a system information receiving component 720, a monitoring component 725, and a processing component 730. The communications manager 715 may be an example of aspects of the communications manager 910 described herein.

The system information receiving component 720 may receive system information via an anchor carrier including an indication that a CRS will be transmitted in a second carrier different from the anchor carrier during a paging occasion.

The monitoring component 725 may monitor, based on the indication, the second carrier for the CRS during the paging occasion.

The processing component 730 may process the CRS received on the second carrier during the paging occasion.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
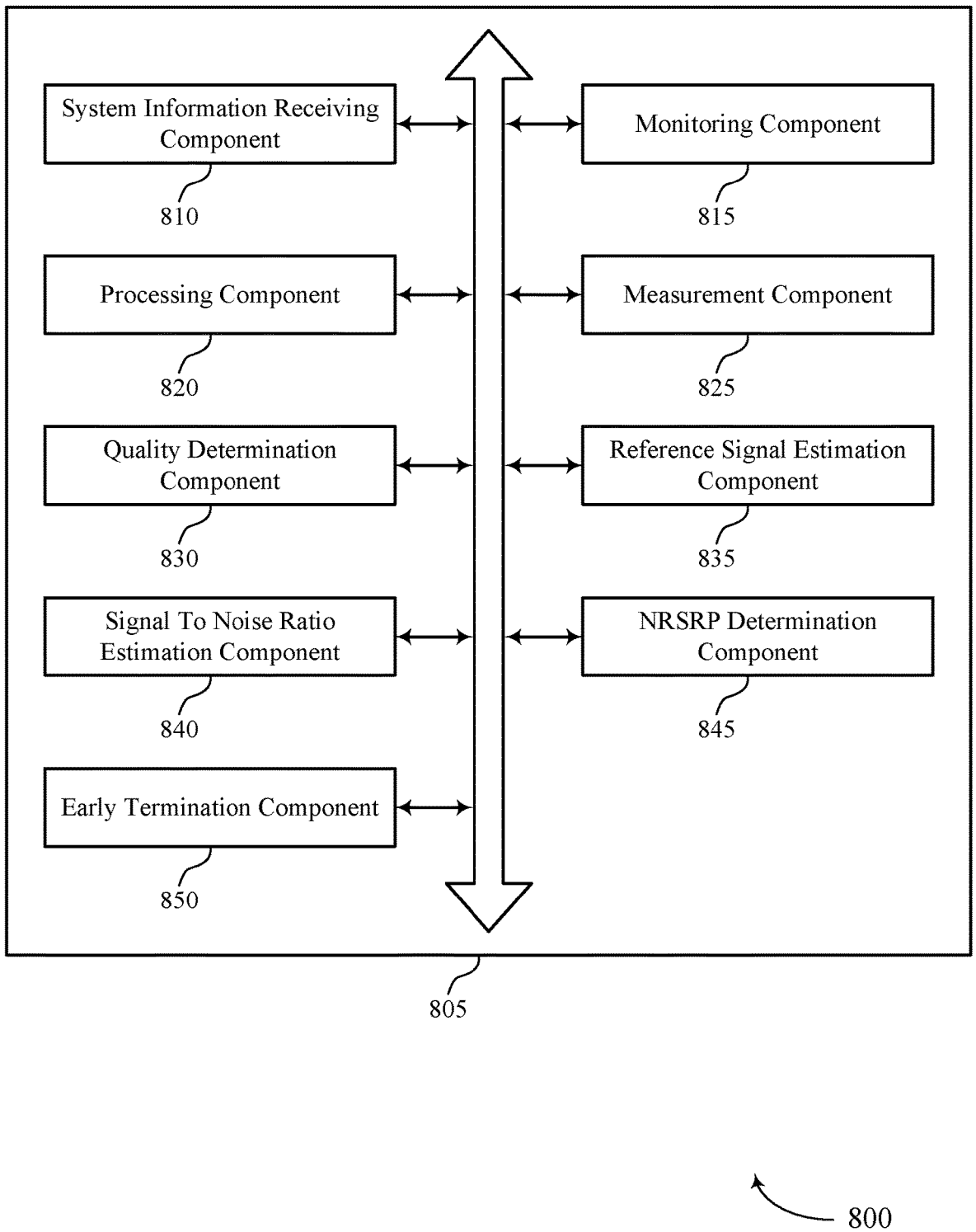
FIG. 8 shows a diagram of a communications manager that supports measurements for NB IoT devices in accordance with aspects of the present disclosure.

FIG. 8 shows a diagram 800 of a communications manager 805 that supports measurements for NB IoT devices in accordance with aspects of the present disclosure. The communications manager 805 may be an example of aspects of a communications manager 615, a communications manager 715, or a communications manager 910 described herein. The communications manager 805 may include a system information receiving component 810, a monitoring component 815, a processing component 820, a measurement component 825, a quality determination component 830, a reference signal estimation component 835, an SNR estimation component 840, a NRSRP determination component 845, and an early termination component 850. Each of these modules may communicate, directly or indirectly, with one another (e.g., via one or more buses).

The system information receiving component 810 may receive system information via an anchor carrier including an indication that a CRS will be transmitted in a second carrier different from the anchor carrier during a paging occasion. In some examples, the system information receiving component 810 may receive, with the system information, a second indication of a physical cell of a cell transmitting the CRS.

The monitoring component 815 may monitor, based on the indication, the second carrier for the CRS during the paging occasion. In some examples, the monitoring component 815 may monitor the second carrier for a paging message during the paging occasion.

The processing component 820 may process the CRS received on the second carrier during the paging occasion. In some examples, the processing component 820 may process an additional reference signal received on the second carrier during the paging occasion.

The measurement component 825 may combine measurements made of both the CRS and the additional reference signal.

The quality determination component 830 may determine a quality of the second carrier based on measurements made of the CRS.

The reference signal estimation component 835 may estimate an RSRP of the second carrier based on the CRS.

The SNR estimation component 840 may estimate an SNR of the second carrier based on the CRS.

The NRSRP determination component 845 may determine an NRSRP of the second carrier based on the CRS.

The early termination component 850 may affect an early termination of the paging occasion based on the estimated SNR of the second carrier.

Figure 9:
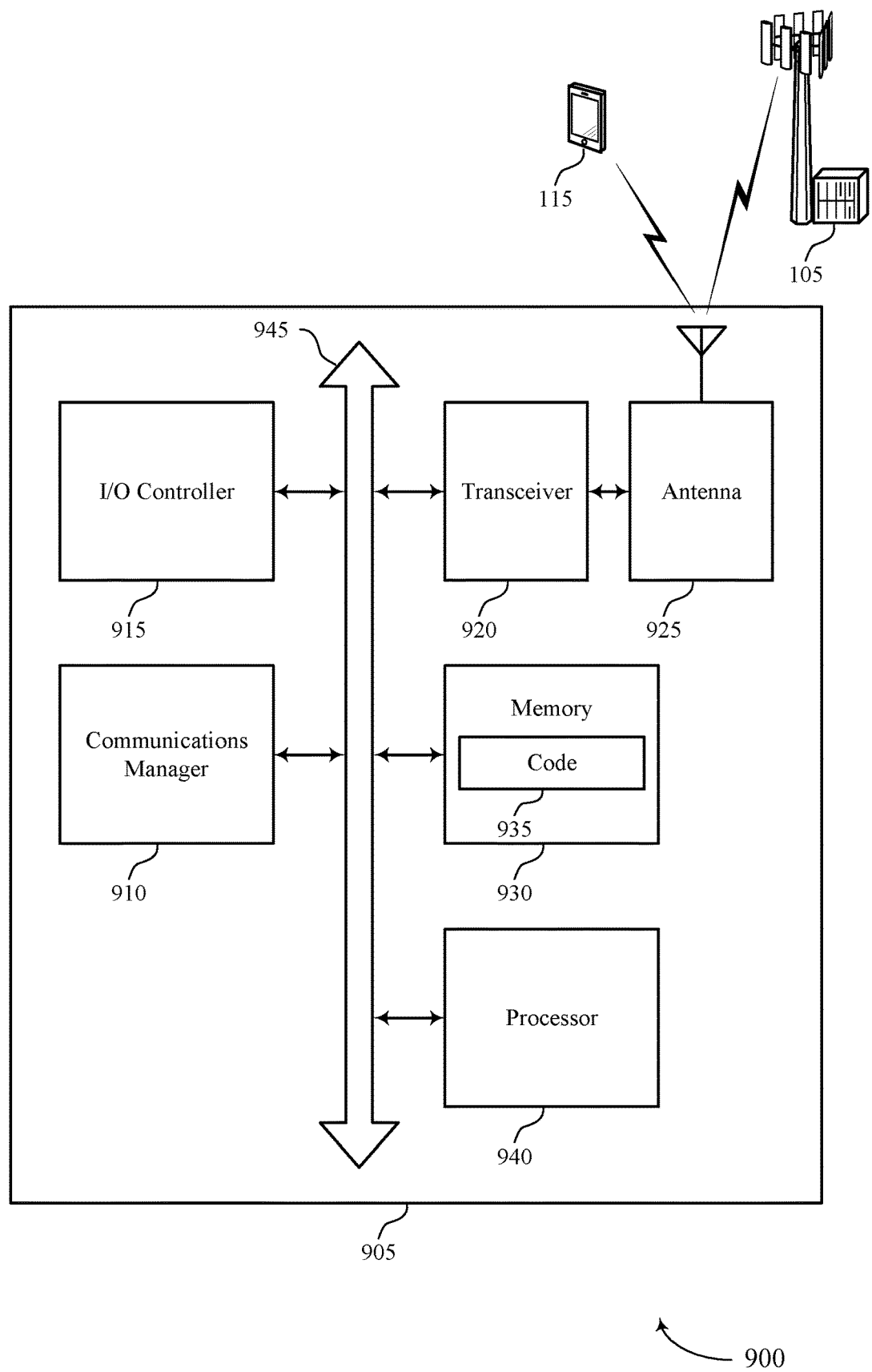
FIG. 9 shows a diagram of a system including a device that supports measurements for NB IoT devices in accordance with aspects of the present disclosure.

FIG. 9 shows a diagram of a system 900 including a device 905 that supports measurements for NB IoT devices in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive system information via an anchor carrier including an indication that a CRS will be transmitted in a second carrier different from the anchor carrier during a paging occasion, monitor, based on the indication, the second carrier for the CRS during the paging occasion, and process the CRS received on the second carrier during the paging occasion.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touch-screen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting measurements for NB IoT devices).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
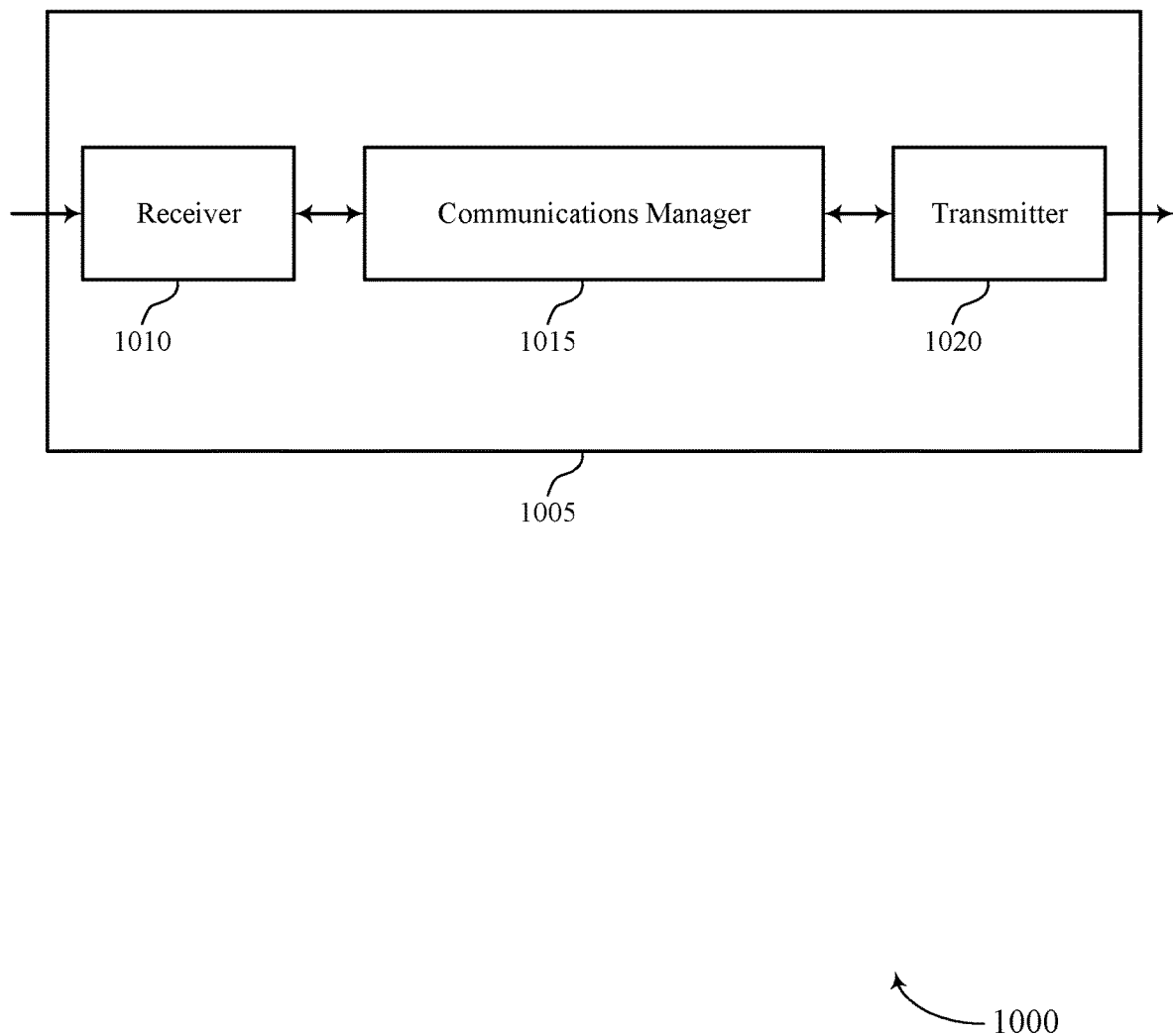
FIGS. 10 and 11 show diagrams of devices that support enhanced measurements for NB IoT devices in accordance with aspects of the present disclosure.

FIG. 10 shows a diagram 1000 of a device 1005 that supports measurements for NB IoT devices in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, information channels related to measurements for NB IoT devices, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify an anchor carrier for communicating with a UE and a second carrier for communicating with the UE, the second carrier being different from the anchor carrier, transmit, via system information on the anchor carrier, an indication that a CRS is to be transmitted via the second carrier during a paging occasion for the UE, and transmit the CRS via the second carrier during the paging occasion. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

The communications manager 1015 as described herein may be implemented to realize one or more potential advantages. One implementation may enable the communications manager 1015 to support improved power conservation at a UE, such as a UE 115, without employing additional signaling from the device 1005. For example, based on enabling a UE to perform quality measurements on a CRS and/or an NRS the device 1005 may refrain from transmitting additional pilot signals, which may result in lower system overhead and improved network efficiency compared to devices employing additional pilot signals for quality measurements. In some implementations, the device 1005 may contribute to improved network efficiency based on causing lower interference levels than devices employing additional pilot signal transmissions.

Figure 11:
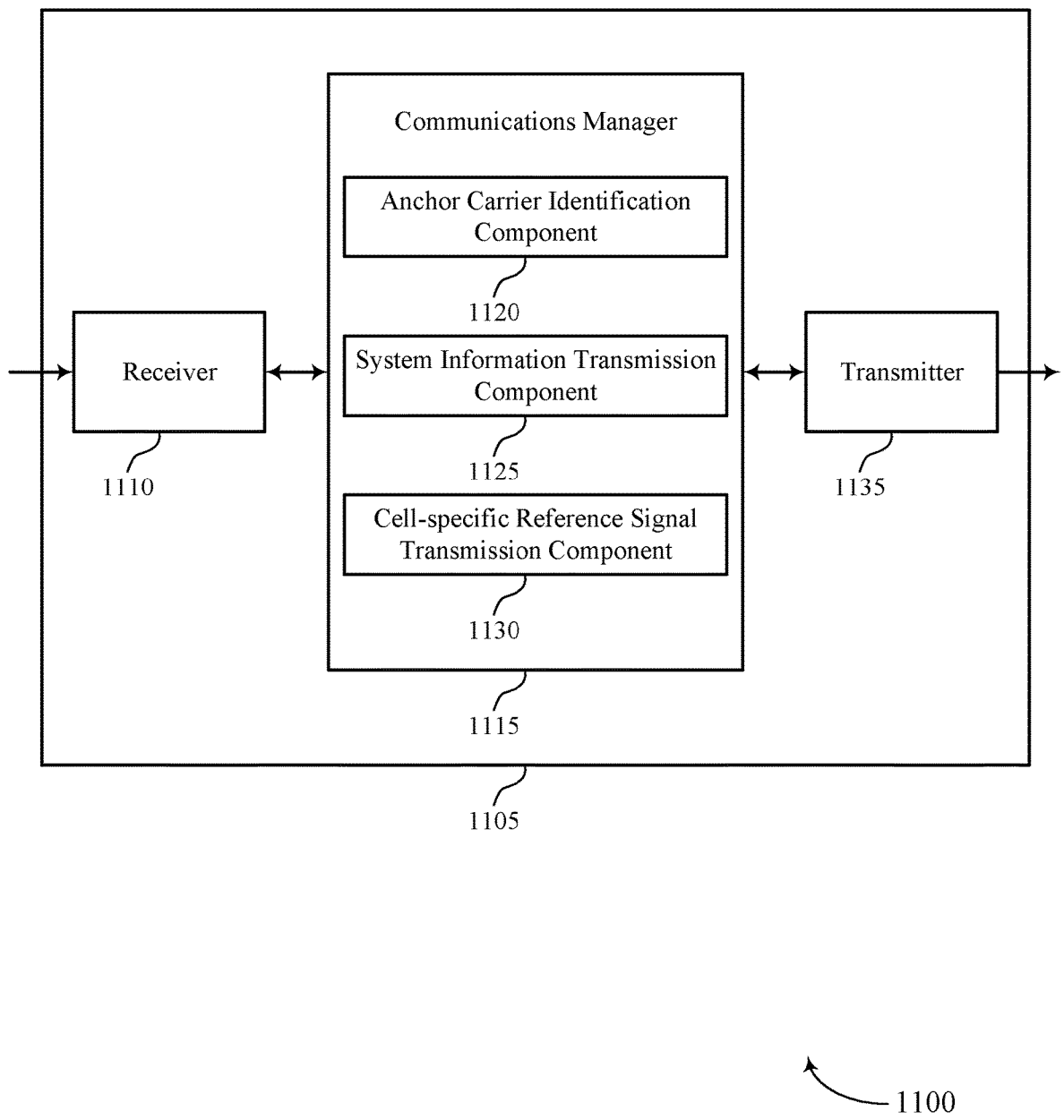

FIG. 11 shows a diagram 1100 of a device 1105 that supports measurements for NB IoT devices in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to measurements for NB IoT devices, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an anchor carrier identification component 1120, a system information transmission component 1125, and a CRS transmission component 1130. The communications manager 1115 may be an example of aspects of the communications manager 1310 described herein.

The anchor carrier identification component 1120 may identify an anchor carrier for communicating with a UE and a second carrier for communicating with the UE, the second carrier being different from the anchor carrier.

The system information transmission component 1125 may transmit, via system information on the anchor carrier, an indication that a CRS is to be transmitted via the second carrier during a paging occasion for the UE.

The CRS transmission component 1130 may transmit the CRS via the second carrier during the paging occasion.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
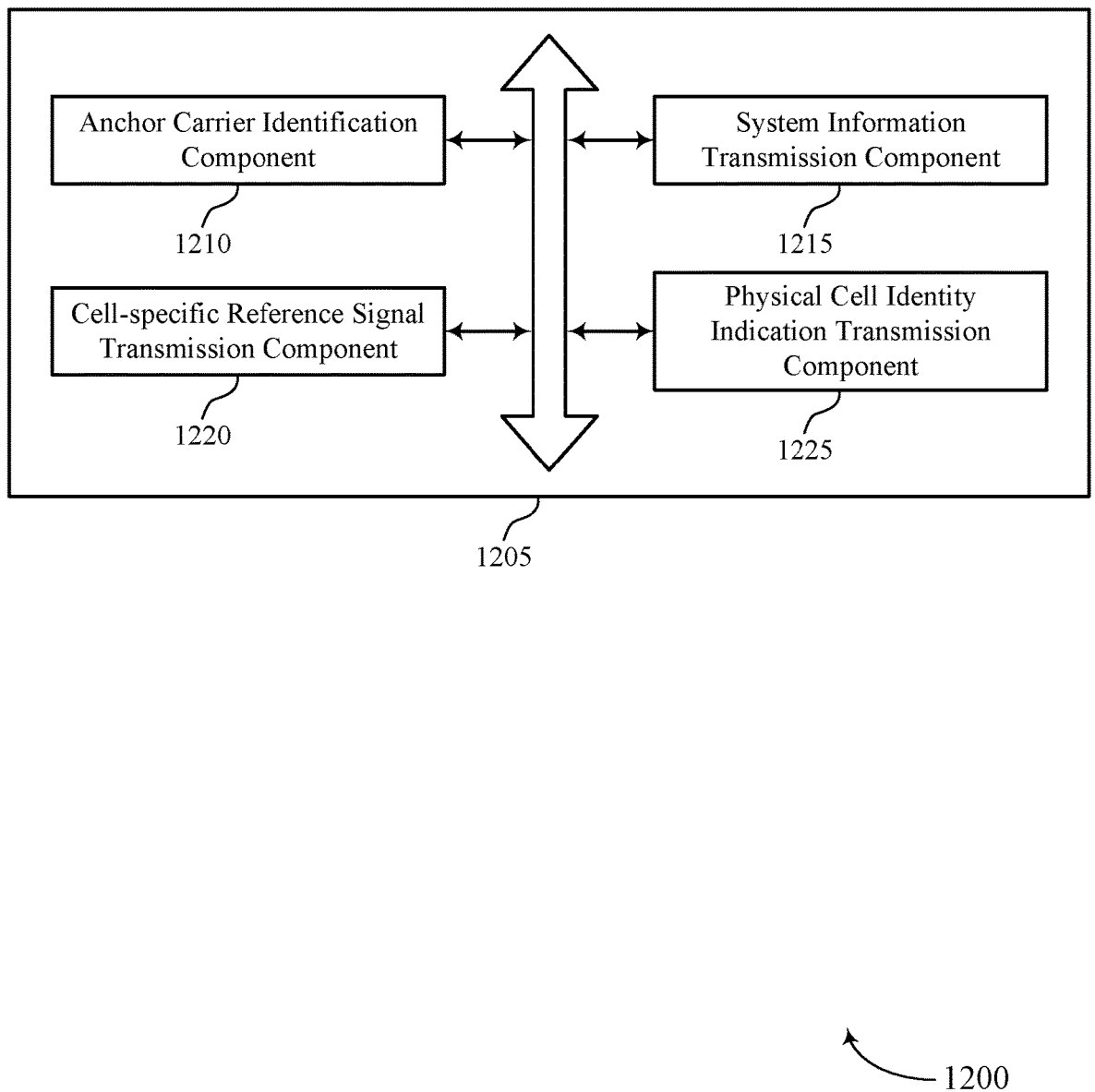
FIG. 12 shows a diagram of a communications manager that supports measurements for NB IoT devices in accordance with aspects of the present disclosure.

FIG. 12 shows a diagram 1200 of a communications manager 1205 that supports measurements for NB IoT devices in accordance with aspects of the present disclosure. The communications manager 1205 may be an example of aspects of a communications manager 1015, a communications manager 1115, or a communications manager 1310 described herein. The communications manager 1205 may include an anchor carrier identification component 1210, a system information transmission component 1215, a CRS transmission component 1220, and a physical cell identity indication transmission component 1225. Each of these modules may communicate, directly or indirectly, with one another (e.g., via one or more buses).

The anchor carrier identification component 1210 may identify an anchor carrier for communicating with a UE and a second carrier for communicating with the UE, the second carrier being different from the anchor carrier.

The system information transmission component 1215 may transmit, via system information on the anchor carrier, an indication that a CRS is to be transmitted via the second carrier during a paging occasion for the UE.

The CRS transmission component 1220 may transmit the CRS via the second carrier during the paging occasion.

The physical cell identity indication transmission component 1225 may transmit, with the system information, a second indication of a physical cell identity for the base station.

Figure 13:
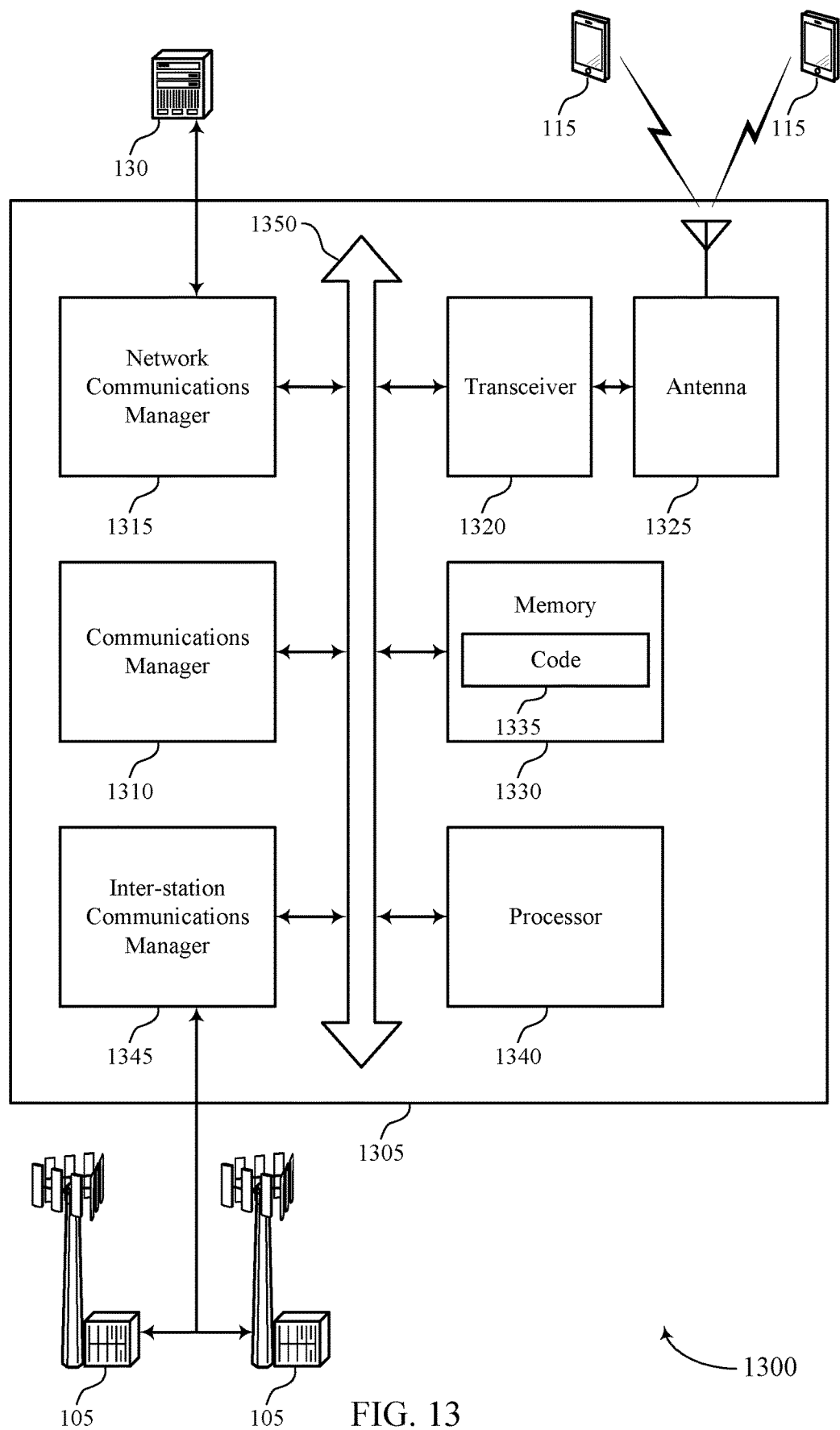
FIG. 13 shows a diagram including a device that supports measurements for NB IoT devices in accordance with aspects of the present disclosure.

FIG. 13 shows a diagram of a diagram 1300 including a device 1305 that supports measurements for NB IoT devices in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify an anchor carrier for communicating with a UE and a second carrier for communicating with the UE, the second carrier being different from the anchor carrier, transmit, via system information on the anchor carrier, an indication that a CRS is to be transmitted via the second carrier during a paging occasion for the UE, and transmit the CRS via the second carrier during the paging occasion.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting measurements for NB IoT devices).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
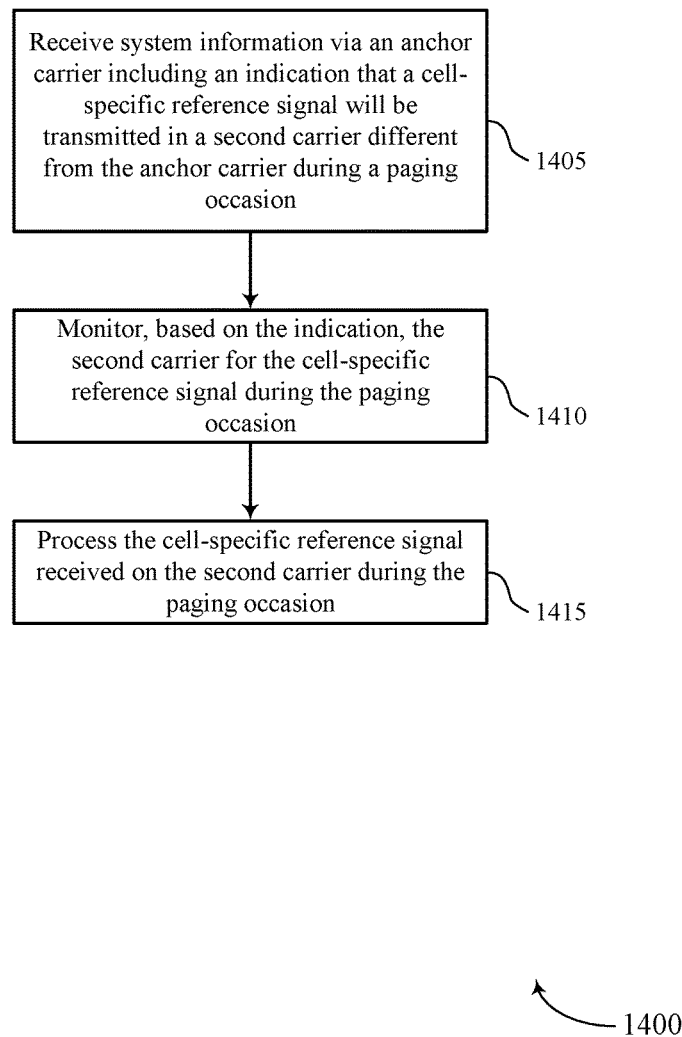
FIGS. 14 through 18 show flowcharts illustrating methods that support measurements for NB IoT devices in accordance with aspects of the present disclosure.

FIG. 14 shows a flowchart illustrating a method 1400 that supports measurements for NB IoT devices in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive system information via an anchor carrier including an indication that a CRS will be transmitted in a second carrier different from the anchor carrier during a paging occasion. The operations of 1405 may be performed according to the methods described herein. In some examples, aspects of the operations of 1405 may be performed by a system information receiving component as described with reference to FIGS. 6 through 9.

At 1410, the UE may monitor, based on the indication, the second carrier for the CRS during the paging occasion. The operations of 1410 may be performed according to the methods described herein. In some examples, aspects of the operations of 1410 may be performed by a monitoring component as described with reference to FIGS. 6 through 9.

At 1415, the UE may process the CRS received on the second carrier during the paging occasion. The operations of 1415 may be performed according to the methods described herein. In some examples, aspects of the operations of 1415 may be performed by a processing component as described with reference to FIGS. 6 through 9.

Figure 15:
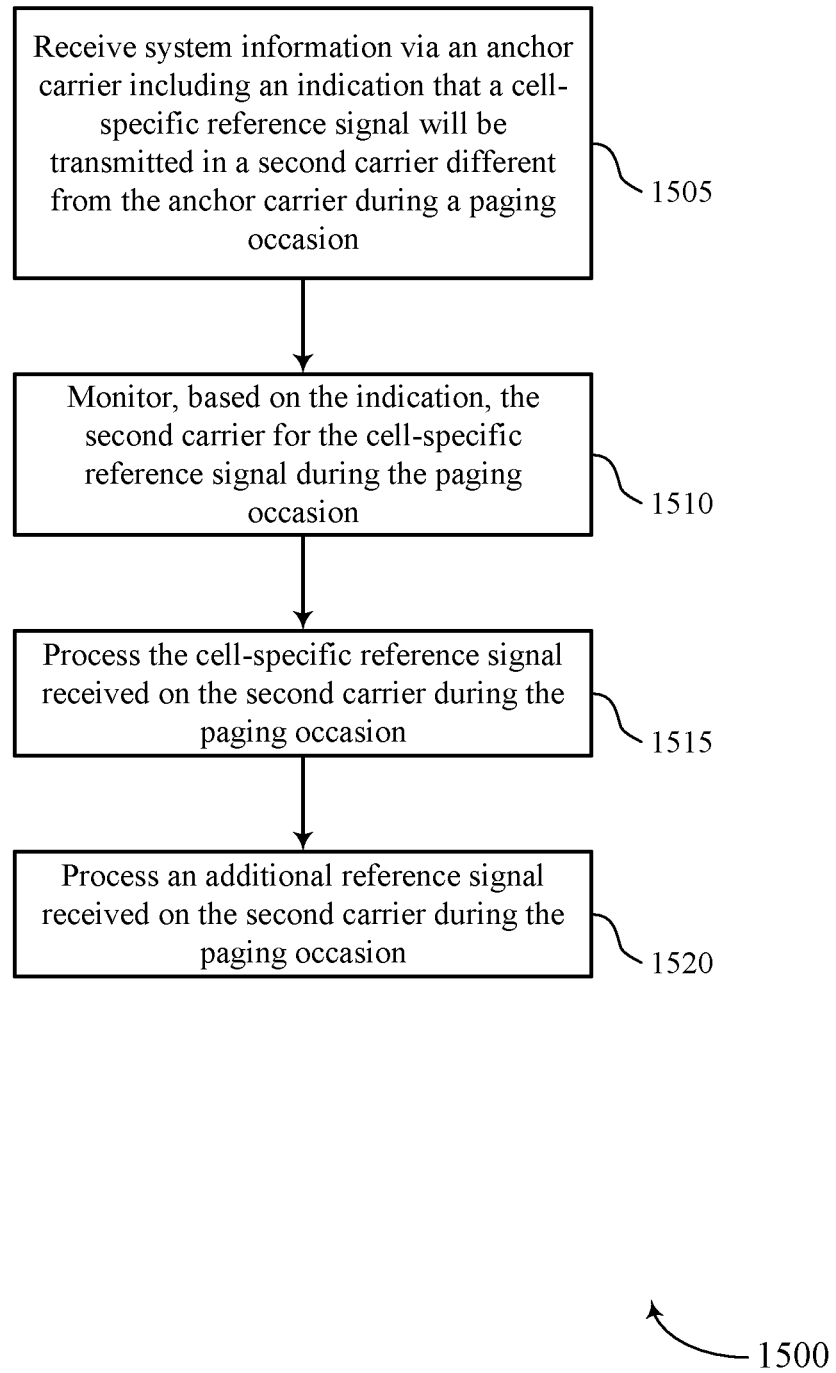

FIG. 15 shows a flowchart illustrating a method 1500 that supports measurements for NB IoT devices in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive system information via an anchor carrier including an indication that a CRS will be transmitted in a second carrier different from the anchor carrier during a paging occasion. The operations of 1505 may be performed according to the methods described herein. In some examples, aspects of the operations of 1505 may be performed by a system information receiving component as described with reference to FIGS. 6 through 9.

At 1510, the UE may monitor, based on the indication, the second carrier for the CRS during the paging occasion. The operations of 1510 may be performed according to the methods described herein. In some examples, aspects of the operations of 1510 may be performed by a monitoring component as described with reference to FIGS. 6 through 9.

At 1515, the UE may process the CRS received on the second carrier during the paging occasion. The operations of 1515 may be performed according to the methods described herein. In some examples, aspects of the operations of 1515 may be performed by a processing component as described with reference to FIGS. 6 through 9.

At 1520, the UE may process an additional reference signal received on the second carrier during the paging occasion. The operations of 1520 may be performed according to the methods described herein. In some examples, aspects of the operations of 1520 may be performed by a processing component as described with reference to FIGS. 6 through 9.

Figure 16:
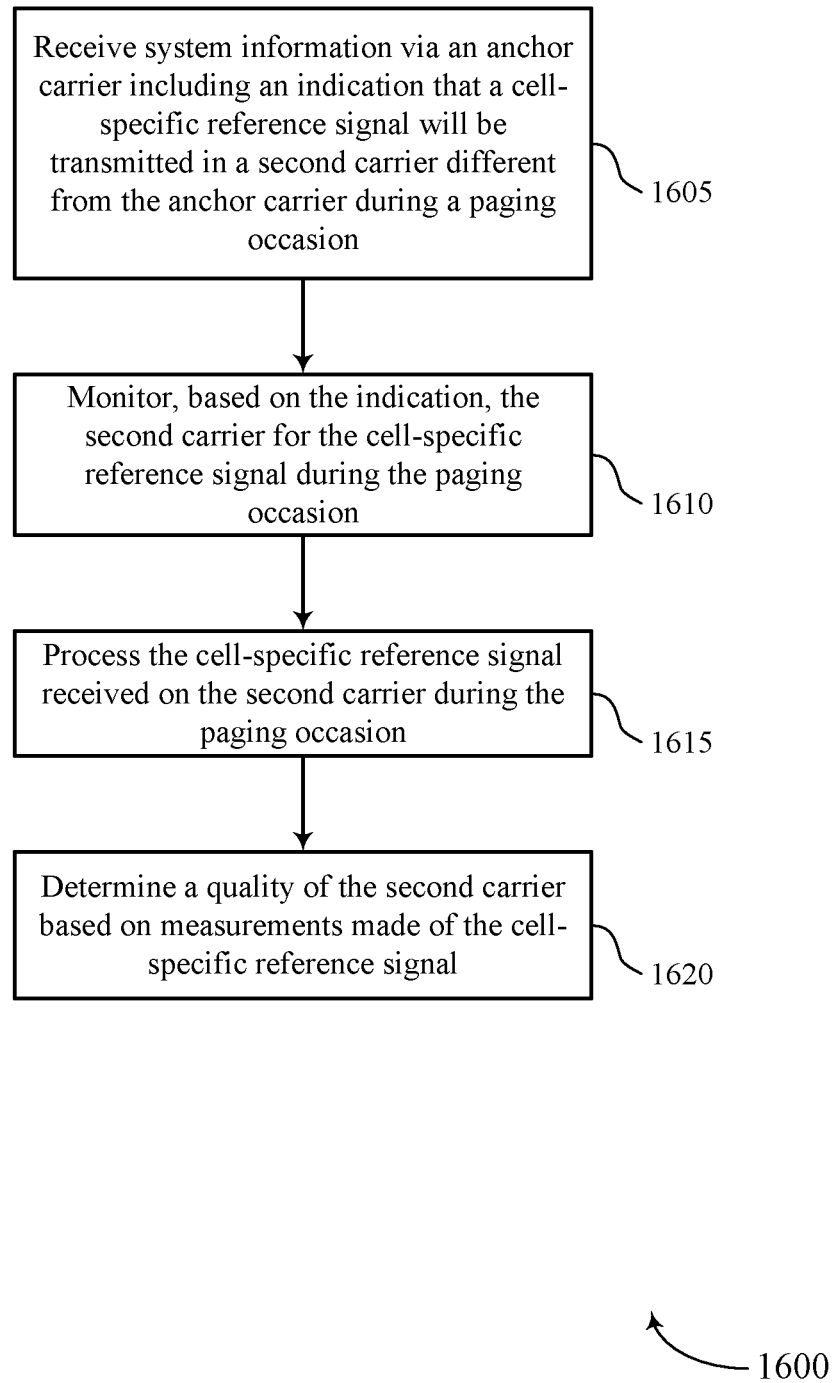

FIG. 16 shows a flowchart illustrating a method 1600 that supports measurements for NB IoT devices in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive system information via an anchor carrier including an indication that a CRS will be transmitted in a second carrier different from the anchor carrier during a paging occasion. The operations of 1605 may be performed according to the methods described herein. In some examples, aspects of the operations of 1605 may be performed by a system information receiving component as described with reference to FIGS. 6 through 9.

At 1610, the UE may monitor, based on the indication, the second carrier for the CRS during the paging occasion. The operations of 1610 may be performed according to the methods described herein. In some examples, aspects of the operations of 1610 may be performed by a monitoring component as described with reference to FIGS. 6 through 9.

At 1615, the UE may process the CRS received on the second carrier during the paging occasion. The operations of 1615 may be performed according to the methods described herein. In some examples, aspects of the operations of 1615 may be performed by a processing component as described with reference to FIGS. 6 through 9.

At 1620, the UE may determine a quality of the second carrier based on measurements made of the CRS. The operations of 1620 may be performed according to the methods described herein. In some examples, aspects of the operations of 1620 may be performed by a quality determination component as described with reference to FIGS. 6 through 9.

Figure 17:
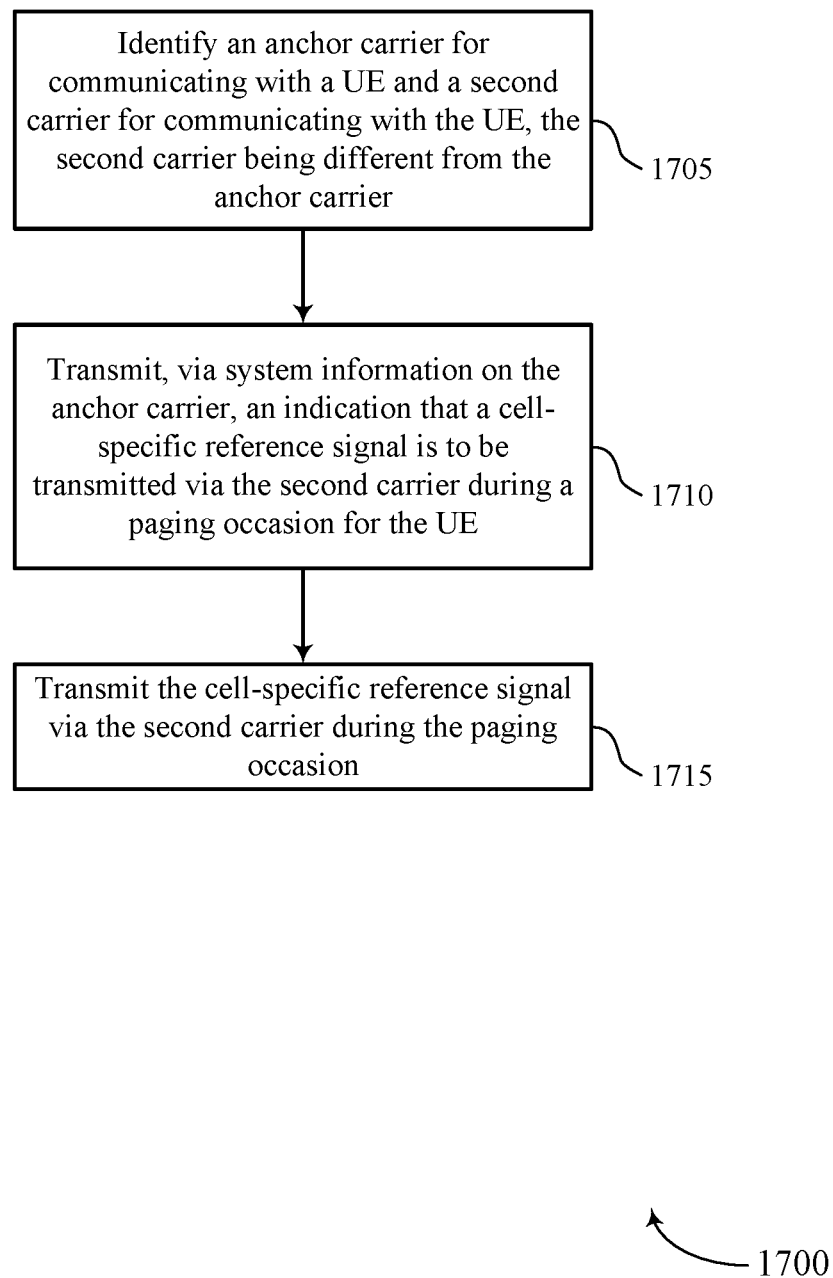

FIG. 17 shows a flowchart illustrating a method 1700 that supports measurements for NB IoT devices in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may identify an anchor carrier for communicating with a UE and a second carrier for communicating with the UE, the second carrier being different from the anchor carrier. The operations of 1705 may be performed according to the methods described herein. In some examples, aspects of the operations of 1705 may be performed by an anchor carrier identification component as described with reference to FIGS. 10 through 13.

At 1710, the base station may transmit, via system information on the anchor carrier, an indication that a CRS is to be transmitted via the second carrier during a paging occasion for the UE. The operations of 1710 may be performed according to the methods described herein. In some examples, aspects of the operations of 1710 may be performed by a system information transmission component as described with reference to FIGS. 10 through 13.

At 1715, the base station may transmit the CRS via the second carrier during the paging occasion. The operations of 1715 may be performed according to the methods described herein. In some examples, aspects of the operations of 1715 may be performed by a CRS transmission component as described with reference to FIGS. 10 through 13.

Figure 18:
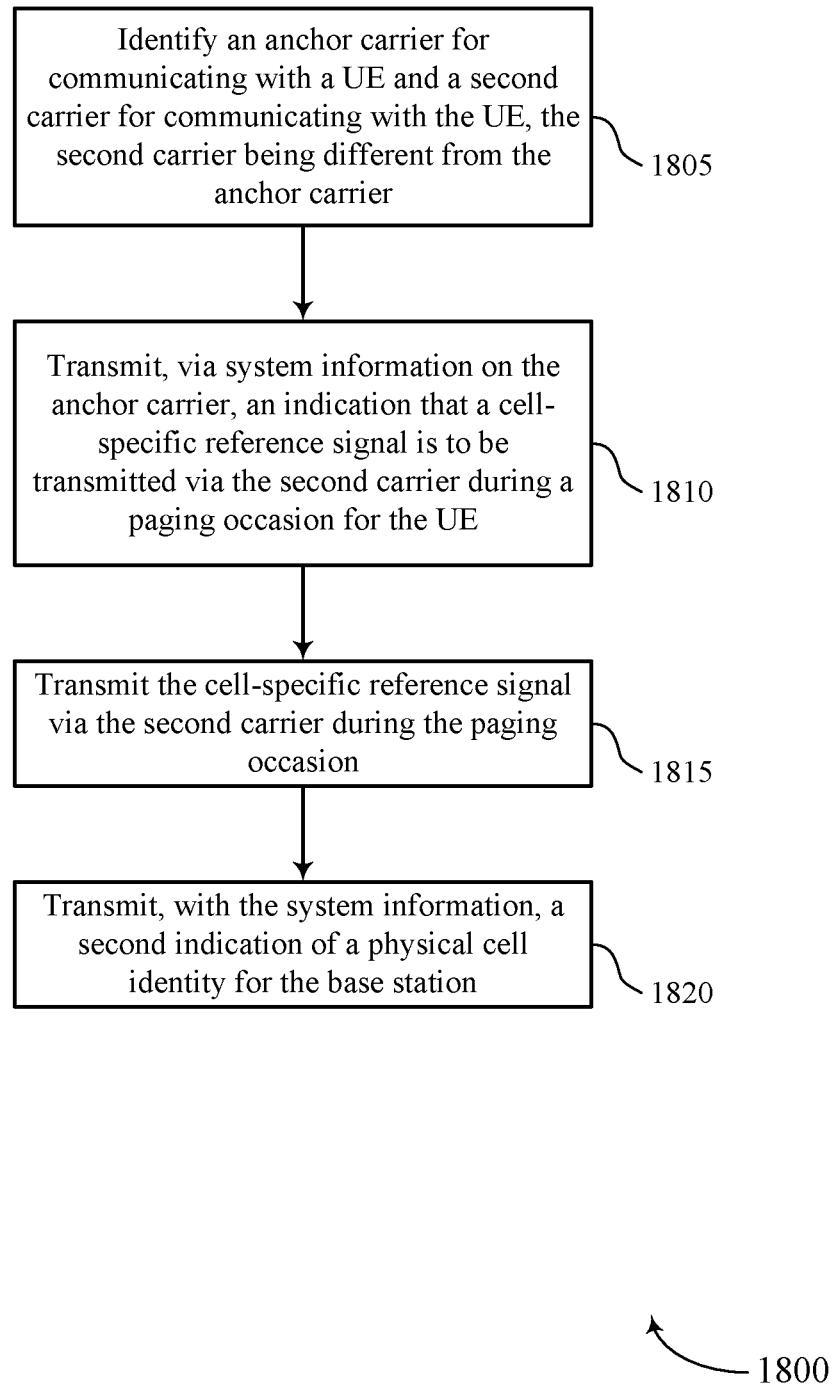

FIG. 18 shows a flowchart illustrating a method 1800 that supports measurements for NB IoT devices in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein.

Additionally or alternatively, a base station may perform aspects of the functions described herein using special-purpose hardware.

At 1805, the base station may identify an anchor carrier for communicating with a UE and a second carrier for communicating with the UE, the second carrier being different from the anchor carrier. The operations of 1805 may be performed according to the methods described herein. In some examples, aspects of the operations of 1805 may be performed by an anchor carrier identification component as described with reference to FIGS. 10 through 13.

At 1810, the base station may transmit, via system information on the anchor carrier, an indication that a CRS is to be transmitted via the second carrier during a paging occasion for the UE. The operations of 1810 may be performed according to the methods described herein. In some examples, aspects of the operations of 1810 may be performed by a system information transmission component as described with reference to FIGS. 10 through 13.

At 1815, the base station may transmit the CRS via the second carrier during the paging occasion. The operations of 1815 may be performed according to the methods described herein. In some examples, aspects of the operations of 1815 may be performed by a CRS transmission component as described with reference to FIGS. 10 through 13.

At 1820, the base station may transmit, with the system information, a second indication of a physical cell identity for the base station. The operations of 1820 may be performed according to the methods described herein. In some examples, aspects of the operations of 1820 may be performed by a physical cell identity indication transmission component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
  receiving system information via an anchor carrier including an indication that a paging message comprising a cell-specific reference signal will be transmitted, during a paging occasion, in a second carrier different from the anchor carrier;
  monitoring, based at least in part on the indication, the second carrier for the cell-specific reference signal during the paging occasion;
  processing the cell-specific reference signal received on the second carrier during the paging occasion; and
  estimating a signal to noise ratio of the second carrier based at least in part on one or more measurements of the cell-specific reference signal made during the paging occasion.

2. The method of claim 1, further comprising:
  processing an additional reference signal received on the second carrier during the paging occasion.

3. The method of claim 2, further comprising:
  combining measurements made of both the cell-specific reference signal and the additional reference signal.

4. The method of claim 2, wherein the additional reference signal is a narrow-band reference signal.

5. The method of claim 1, further comprising:
  receiving, with the system information, a second indication of a physical cell of a cell transmitting the cell-specific reference signal.

6. The method of claim 1, further comprising:
  estimating a reference signal received power of the second carrier based at least in part on the cell-specific reference signal.

7. The method of claim 1, further comprising:
  determining a narrow-band reference signal received power of the second carrier based at least in part on the cell-specific reference signal.

8. The method of claim 1, further comprising:
  monitoring the second carrier for the paging message during the paging occasion; and
  performing an early termination of the paging occasion based at least in part on the estimated signal to noise ratio of the second carrier.

9. The method of claim 1, wherein the UE is a narrow-band Internet of Things (IoT) device.

10. An apparatus for wireless communications at a user equipment (UE), comprising:
  a processor; and
  memory in electronic communication with the processor, wherein the memory comprises instructions executable by the processor to cause the apparatus to:
    receive system information via an anchor carrier including an indication that a paging message comprising a cell-specific reference signal will be transmitted, during a paging occasion, in a second carrier different from the anchor carrier;
monitor, based at least in part on the indication, the second carrier for the cell-specific reference signal during the paging occasion;
process the cell-specific reference signal received on the second carrier during the paging occasion; and
estimate a signal to noise ratio of the second carrier based at least in part on one or more measurements of the cell-specific reference signal made during the paging occasion.

11. The apparatus of claim 10, wherein the instructions are further executable by the processor to cause the apparatus to:
process an additional reference signal received on the second carrier during the paging occasion.

12. The apparatus of claim 11, wherein the instructions are further executable by the processor to cause the apparatus to:
combine measurements made of both the cell-specific reference signal and the additional reference signal.

13. The apparatus of claim 11, wherein the additional reference signal is a narrow-band reference signal.

14. The apparatus of claim 10, wherein the instructions are further executable by the processor to cause the apparatus to:
receive, with the system information, a second indication of a physical cell of a cell transmitting the cell-specific reference signal.

15. The apparatus of claim 10, wherein the instructions are further executable by the processor to cause the apparatus to:
estimate a reference signal received power of the second carrier based at least in part on the cell-specific reference signal.

16. The apparatus of claim 10, wherein the instructions are further executable by the processor to cause the apparatus to:
determine a narrow-band reference signal received power of the second carrier based at least in part on the cell-specific reference signal.

17. The apparatus of claim 10, wherein the instructions are further executable by the processor to cause the apparatus to:
monitor the second carrier for the paging message during the paging occasion; and
perform an early termination of the paging occasion based at least in part on the estimated signal to noise ratio of the second carrier.

18. The apparatus of claim 10, wherein the UE is a narrow-band Internet of Things (IoT) device.

19. An apparatus for wireless communications at a user equipment (UE), comprising:
means for receiving system information via an anchor carrier including an indication that a paging message comprising a cell-specific reference signal will be transmitted, during a paging occasion, in a second carrier different from the anchor carrier;
means for monitoring, based at least in part on the indication, the second carrier for the cell-specific reference signal during the paging occasion;
means for processing the cell-specific reference signal received on the second carrier during the paging occasion; and
means for estimating a signal to noise ratio of the second carrier based at least in part on one or more measurements of the cell-specific reference signal made during the paging occasion.

20. The apparatus of claim 19, further comprising:
means for processing an additional reference signal received on the second carrier during the paging occasion.

21. The apparatus of claim 20, further comprising:
means for combining measurements made of both the cell-specific reference signal and the additional reference signal.

22. The apparatus of claim 19, further comprising:
means for receiving, with the system information, a second indication of a physical cell of a cell transmitting the cell-specific reference signal.

23. A non-transitory computer-readable medium storing code for wireless communications at a user equipment (UE), the code comprising instructions executable by a processor to:
receive system information via an anchor carrier including an indication that a paging message comprising a cell-specific reference signal will be transmitted, during a paging occasion, in a second carrier different from the anchor carrier;
monitor, based at least in part on the indication, the second carrier for the cell-specific reference signal during the paging occasion;
process the cell-specific reference signal received on the second carrier during the paging occasion; and
estimate a signal to noise ratio of the second carrier based at least in part on one or more measurements of the cell-specific reference signal made during the paging occasion.

24. The non-transitory computer-readable medium of claim 23, wherein the instructions are further executable to:
process an additional reference signal received on the second carrier during the paging occasion.

25. The non-transitory computer-readable medium of claim 24, wherein the instructions are further executable to:
combine measurements made of both the cell-specific reference signal and the additional reference signal.

26. The non-transitory computer-readable medium of claim 23, wherein the instructions are further executable to:
receive, with the system information, a second indication of a physical cell of a cell transmitting the cell-specific reference signal.

* * * * *